(12) United States Patent  
Saeki

(10) Patent No.: US 7,237,832 B2
(45) Date of Patent: Jul. 3, 2007

(54) VEHICLE BODY SIDE STRUCTURE

(75) Inventor: Hidetsugu Saeki, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 217 days.

(21) Appl. No.: 11/006,564

(22) Filed: Dec. 8, 2004

(65) Prior Publication Data
US 2005/0151363 A1 Jul. 14, 2005

(30) Foreign Application Priority Data
Jan. 13, 2004 (JP) ............................. 2004-005465

(51) Int. Cl.
B60R 27/00 (2006.01)
(52) U.S. Cl. .............................. 296/193.06; 296/203.03
(58) Field of Classification Search ........... 296/190.08, 296/193.05, 193.06, 203.03
See application file for complete search history.

(56) References Cited

U.S. PATENT DOCUMENTS 6,139,094 A * 10/2000 Teply et al. ........... 296/203.03
6,572,179 B2 * 6/2003 Dahl et al. ............. 296/203.03
6,983,981 B2 * 1/2006 Saeki ..................... 296/203.03
2001/0005092 A1 * 6/2001 Sakyo et al. ........... 296/203.03
2003/0071487 A1 * 4/2003 Dahl et al. ............. 296/203.03
2005/0189790 A1 * 9/2005 Chernoff et al. ....... 296/193.05

FOREIGN PATENT DOCUMENTS

JP 3335781 B2 8/2002

* cited by examiner

Primary Examiner—Lori L. Lyjak
(74) Attorney, Agent, or Firm—Global IP Counselors

(57) ABSTRACT

A vehicle body structure having a pillar member maintains the shape of a pillar member in a substantially linear state when the pillar member deforms inward toward the passenger compartment during a side collision. The pillar member has a collision force converting structure that is constituted by the curved shape of the pillar member. When a side collision force is imparted to the pillar member, the collision force converting structure converts it into and maintains it as a force acting on the pillar member in the lengthwise direction of the pillar member. Thus, the collision force is absorbed as a lengthwise compressive load in the pillar member. A shape maintaining structure restricts the inward deformation of the pillar member 3 toward the passenger compartment and holds the pillar member in a substantially linear shape to increase the efficiency with which the collision load is transferred to the side roof rail and side sill.

24 Claims, 16 Drawing Sheets

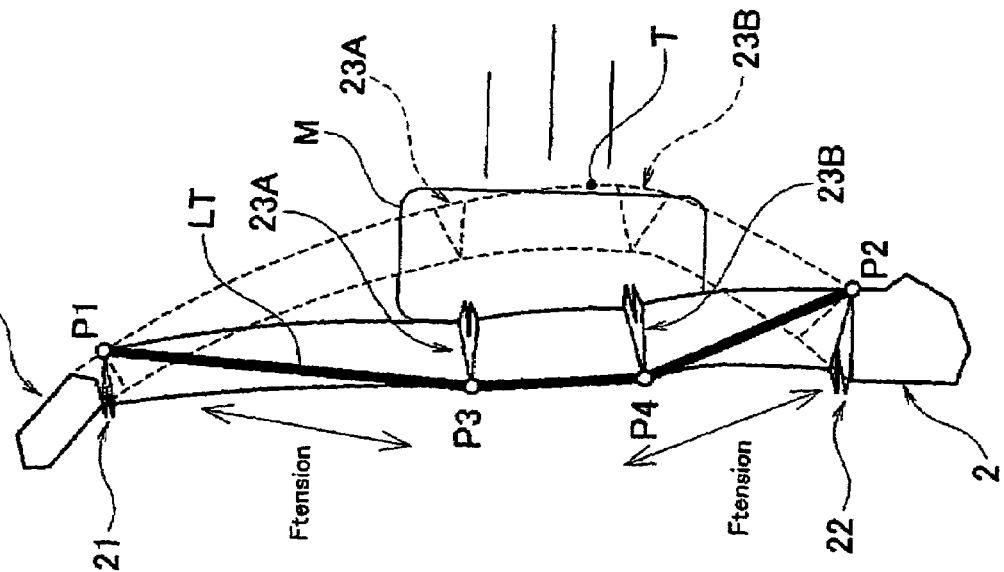
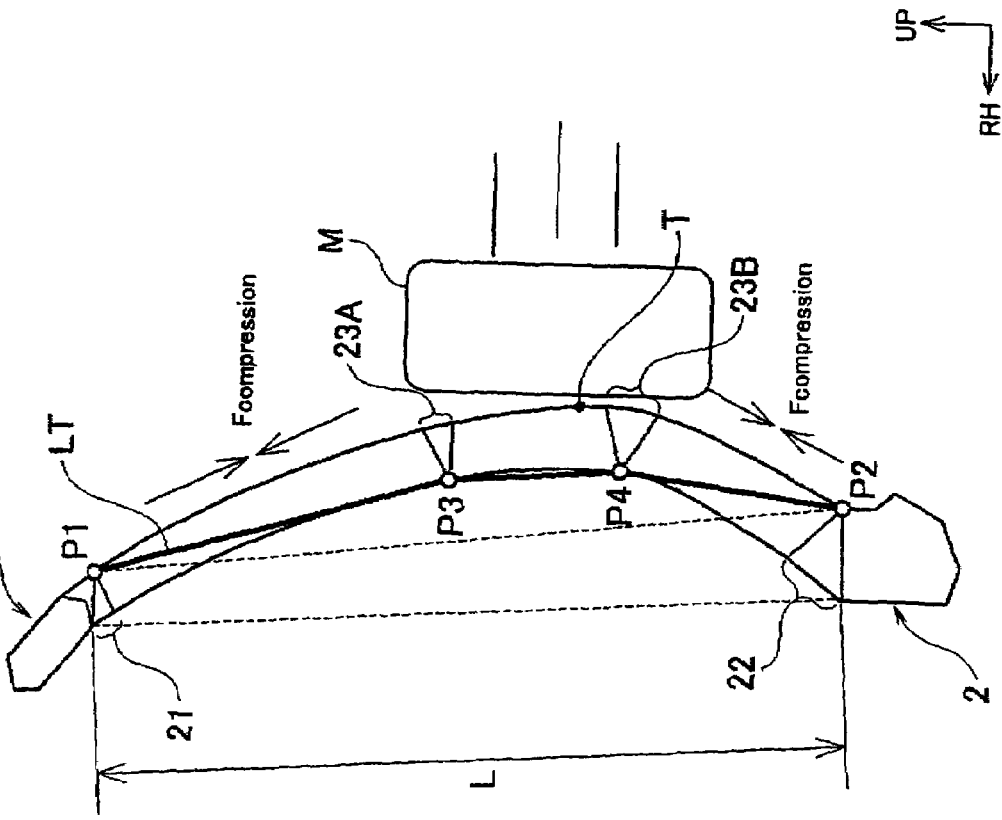

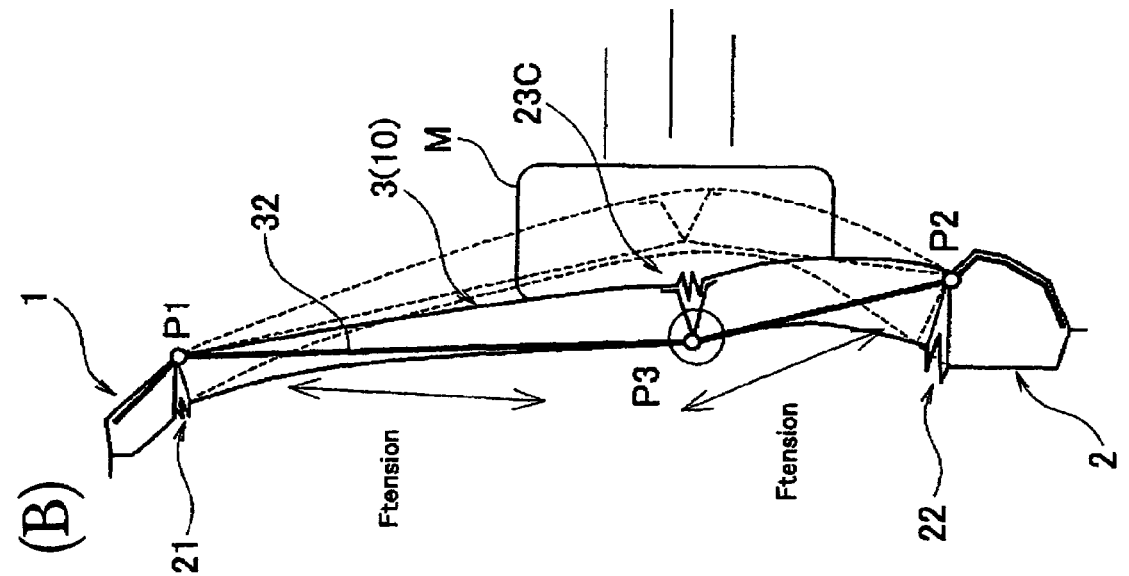
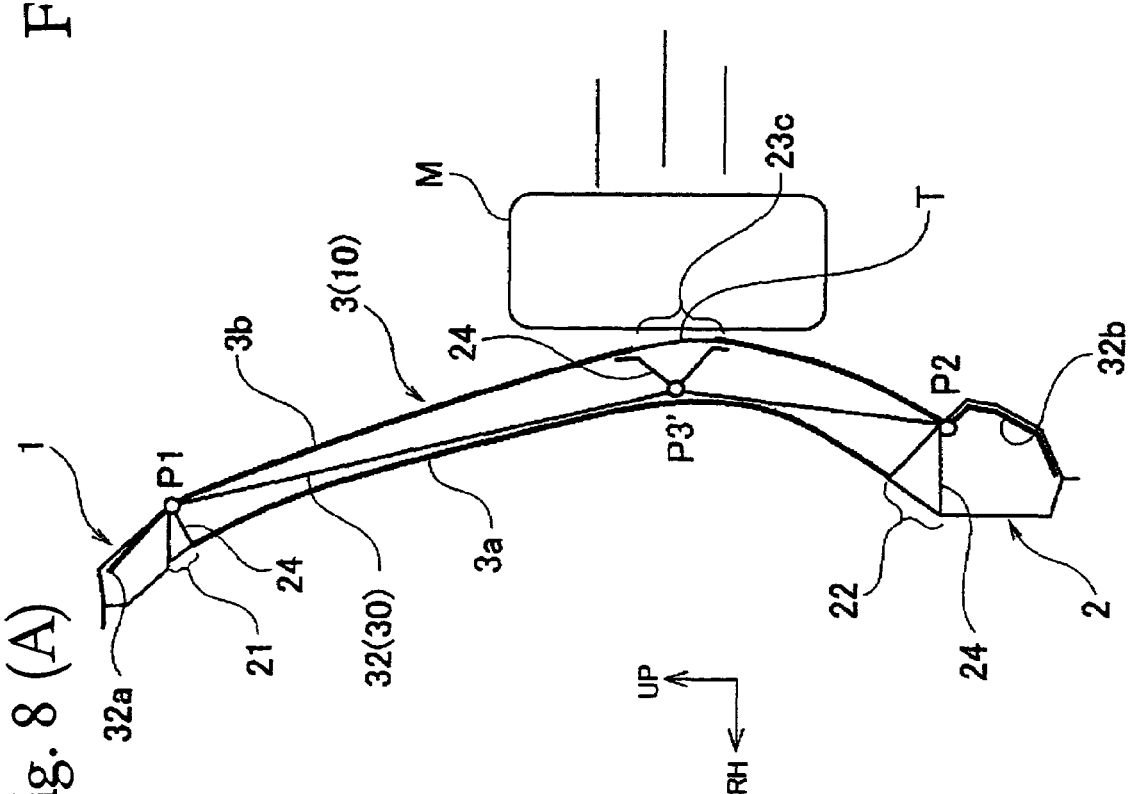

VEHICLE BODY SIDE STRUCTURE

CROSS-REFERENCE TO RELATED APPLICATIONS

This application claims priority to Japanese Patent Application No. 2004-5465. The entire disclosure of Japanese Patent Application No. 2004-5465 is hereby incorporated herein by reference.

BACKGROUND OF THE INVENTION

1. Field of the Invention

The present invention generally relates to a vehicle body structure for an automobile. More specifically, the present invention relates to a vehicle body side structure that is configured to absorb the energy of a side impact.

2. Background Information

Some conventional vehicle body structures have been proposed in which a strength discontinuity is provided in a lower portion of a center pillar having a closed cross sectional structure. During a side collision, the structure bends into the passenger compartment in an appropriate manner at the strength discontinuity, thus preventing localized bending at the middle area and the upper area of the center pillar. As a result, the center pillar is displaced toward the passenger compartment in a substantially uniform manner and the amount of inward deformation is relatively small. One example of such a vehicle body structure is disclosed in Japanese Patent No. 335781 (see, pages 3-4, FIG. 6).

In view of the above, it will be apparent to those skilled in the art from this disclosure that there exists a need for an improved vehicle body structure. This invention addresses this need in the art as well as other needs, which will become apparent to those skilled in the art from this disclosure.

SUMMARY OF THE INVENTION

It has been discovered that in a conventional side structure of a vehicle body as disclosed in Japanese Patent No. 335781 that since the lower section of the center pillar bends into the passenger compartment during the initial stage of a collision due to the strength discontinuity, the strength of such a conventional vehicle body is determined by its bending strength, and it is difficult to expect a great improvement in strength.

After it undergoes bending deformation, the center pillar advances toward the passenger compartment in a substantially uniform manner and, as it does so, a tensile force develops in the center pillar. As a result, the initial arched shape of the center pillar is stretched out and the center pillar enters a state in which it is constantly acted on by a force that tends to bend it in the opposite direction (toward the passenger compartment).

Therefore, once the lower section of the center pillar deforms inwardly toward the passenger compartment, the deforming movement toward the passenger compartment continues with the continuing input of a side collision load and it is possible for the center pillar to move into the passenger compartment by a large amount.

In recent years, there has been an increasing demand for more versatile vehicle body structures due to diversification in the size and shape of vehicles. Accordingly, there is a need for more practical measures for achieving a high degree of control over the mode of the inward movement of center pillar and significantly increasing the strength of the vehicle body.

In view of these needs, the object of the present invention is to provide a vehicle body structure that can efficiently transfer/disperse a load imparted to a pillar member during a side collision from the pillar member to the side roof rail and side sill or other frame members that are connected to the upper and lower ends of the pillar member, there by making it possible to reduce the weight of the pillar member while achieving increased strength. The invention accomplishes this goal by holding the shape of the transversely inwardly deforming pillar member in a substantially linear state.

In accordance with one aspect of the present invention, a vehicle body structure is provided that basically comprises a pillar member, an upper vehicle body support, and a lower vehicle body support. The pillar member is configured and arranged to extend in a generally vertical direction of the vehicle body structure between an upper pillar end section and a lower pillar end section. The upper vehicle body support is fixedly coupled to the upper pillar end section of the pillar member. The lower vehicle body support is fixedly coupled to the lower pillar end section of the pillar member. The pillar member includes a shape maintaining structure that is configured and arranged to maintain a generally linear shape of the pillar member between the upper and lower pillar end sections upon being deformed transversely inward due to a side collision force acting inwardly on the pillar member in a generally horizontal direction from a vehicle exterior.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 6(A) is a schematic view illustrating the vehicle body structure of FIG. 4 just prior a side collision to illustrate a deformation mode of the second embodiment of the present invention during a side collision;

FIG. 6(B) is a schematic view illustrating the vehicle body structure of FIG. 4 after the side collision of FIG. 6(A) to illustrate the deformation mode of the second embodiment of the present invention during a side collision;

FIG. 8(A) is a schematic view illustrating the vehicle body structure of FIG. 7 just prior a side collision to illustrate a deformation mode of the third embodiment of the present invention during a side collision;

FIG. 8(B) is a schematic view illustrating the vehicle body structure of FIG. 7 after the side collision of FIG. 8(A) to illustrate the deformation mode of the third embodiment of the present invention during a side collision;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

The vehicle body structures of the present invention includes one or more pillars or vertical support members (generally referred to as a pillar member) having a shape maintaining structure that is configured and arranged to maintain a generally linear shape of the pillar member between upper and lower pillar end sections upon being deformed transversely inward due to a side collision force acting inwardly on the pillar member in a generally horizontal direction from a vehicle exterior. In other words, the shape maintaining structure of the present invention holds the shape of a pillar member that is deforming transversely inward due to a side collision force such that the shape of the pillar member remains generally linear in the vertical direction of the vehicle. Thus, as the pillar member deforms transversely inward, the shape maintaining structure holds the shape of the pillar member such that it remains generally linear. As a result, the generally vertical converted collision load acting on the pillar member is efficiently transferred to the side roof rail and the side sill such that a reaction force is maintained even after the deformation is finished and the energy absorption efficiency is increased. Thus, the deformation of the pillar member toward the inside of the passenger compartment can be reduced and the weight of the pillar member can be reduced while achieving increased strength.

Preferably, vehicle body structures of the present invention also includes one or more pillars or vertical support members having a collision force converting structure that is configured and arranged to convert a side collision force acting inwardly on a pillar member in a generally horizontal direction from a vehicle exterior into a force acting lengthwise along the pillar member in a generally vertical direction of the vehicle body structure and to maintain the force in the orientation. In other words, with the present invention, when a side collision force acts inwardly on a pillar member in a generally horizontal direction from a vehicle exterior, the side collision force is converted by the collision force converting structure into a force acting lengthwise along the pillar member in a generally vertical direction of the vehicle body structure and the force is maintained in the generally vertical orientation. As a result, the collision force is absorbed as a lengthwise compressive load in the pillar member.

FIRST EMBODIMENT

Figure 1:
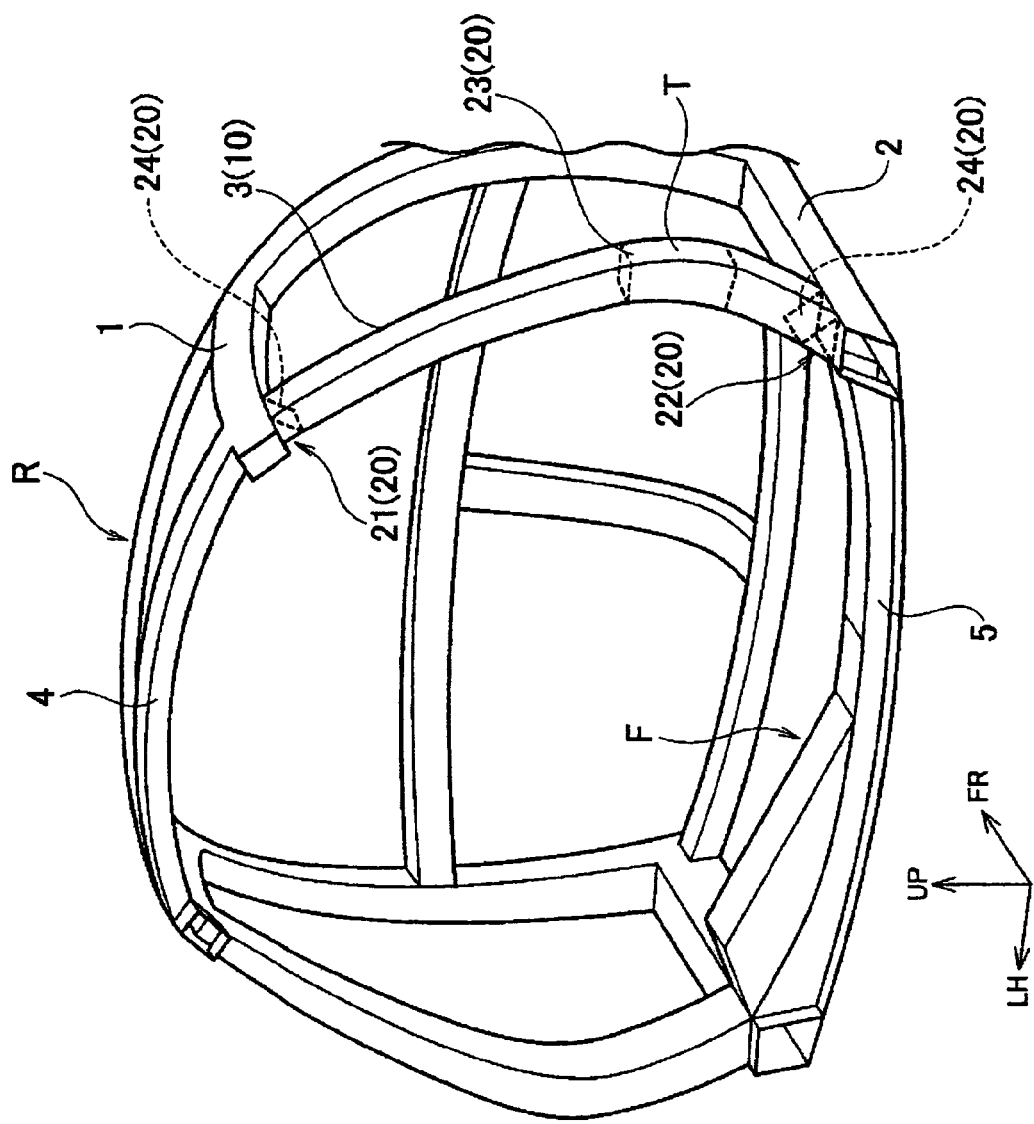
FIG. 1 is a rear perspective view of a passenger compartment portion of a vehicle body frame that includes a vehicle body structure in accordance with a first embodiment of the present invention.
Figure 2:
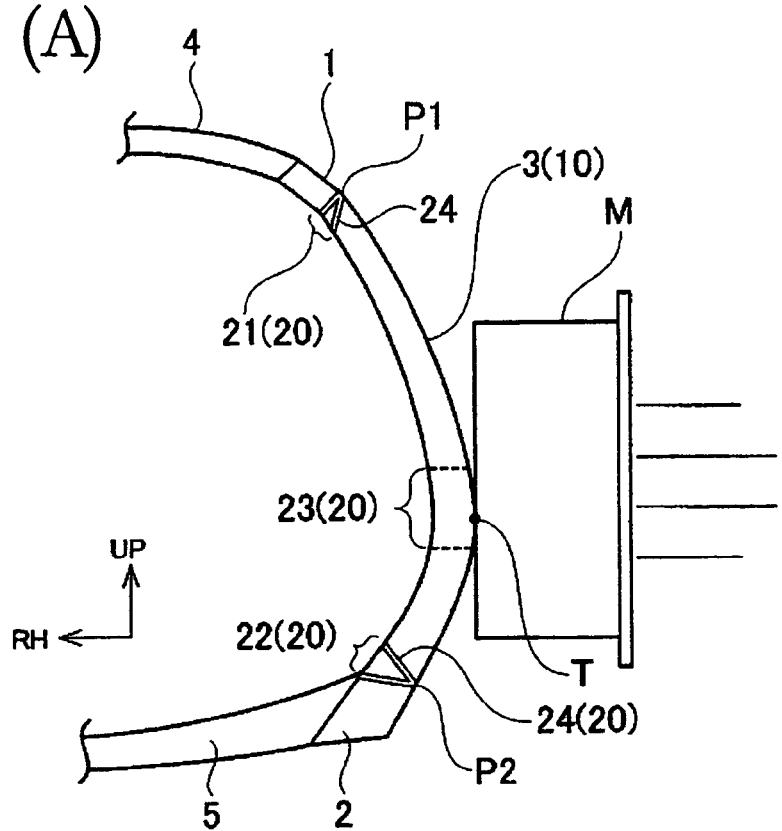
FIG. 2(A) is a schematic view illustrating the vehicle body structure of FIG. 1 just prior a side collision to illustrate a deformation mode of the first embodiment of the present invention during a side collision.
FIG. 2(B) is a schematic view illustrating the vehicle body structure of FIG. 1 after the side collision of FIG. 2(A) to illustrate the deformation mode of the first embodiment of the present invention during a side collision.
Figure 2:
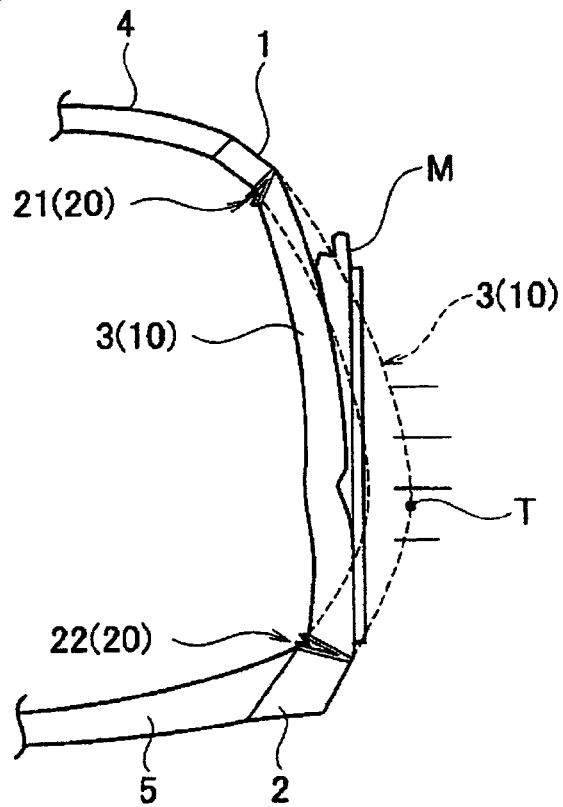
Figure 3:
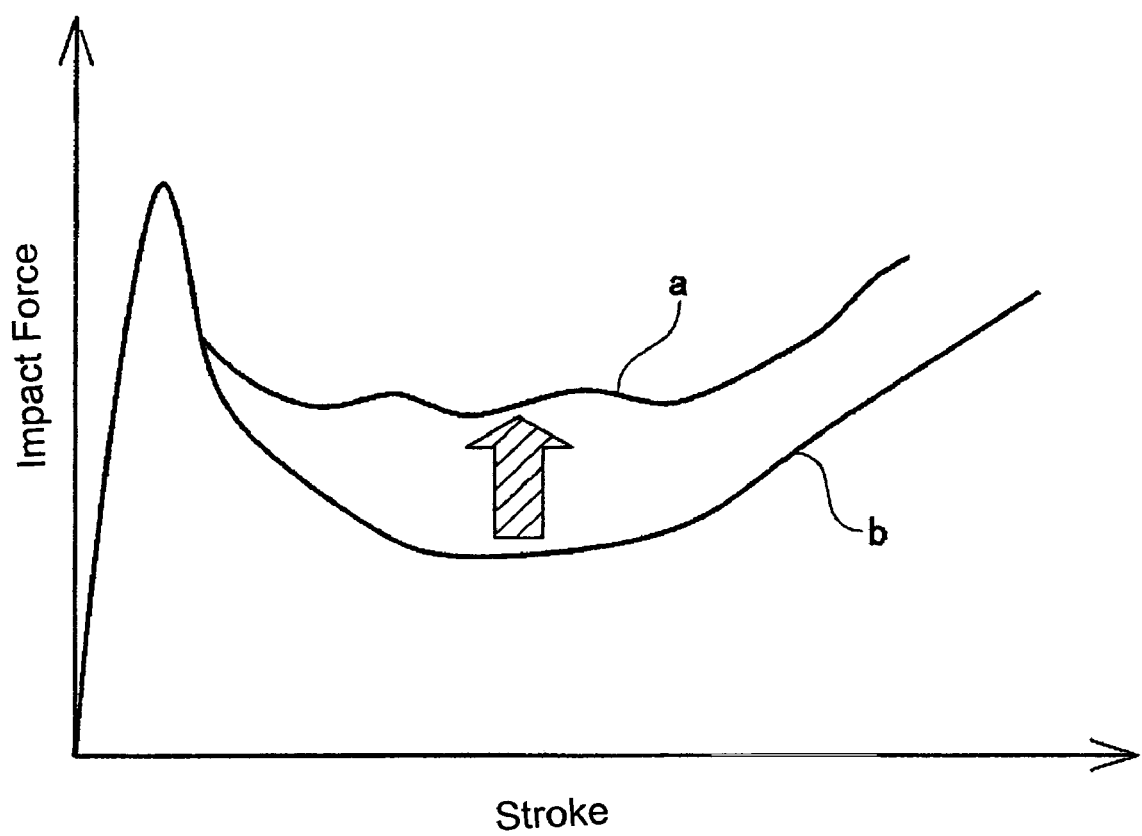
FIG. 3 is a graph comparing the vehicle body reaction force characteristic of the first embodiment to that of a conventional vehicle body structure during a side collision.

Referring initially to FIGS. 1-3, a vehicle body structure is illustrated in accordance with a first embodiment of the present invention. FIG. 1 is a rear perspective view of a passenger compartment portion of a vehicle body frame that includes a vehicle body structure in accordance with a first embodiment of the present invention. FIG. 2(A) is a schematic view illustrating the vehicle body structure of FIG. 1 just prior a side collision to illustrate a deformation mode of the first embodiment of the present invention during a side collision. FIG. 2(B) is a schematic view illustrating the vehicle body structure of FIG. 1 after the side collision of FIG. 2(A) to illustrate the deformation mode of the first embodiment of the present invention during a side collision. FIG. 3 is a graph comparing the vehicle body reaction force characteristic of the first embodiment to that of a conventional vehicle body structure during a side collision.

As shown in FIG. 1, the vehicle body structure of the first embodiment basically includes a pair of left and right side roof rails 1, a pair of left and right side sills 2, a pair of center pillars(pillar members) 3, a plurality of roof cross members 4 and a plurality of floor cross members 5. The side roof rails 1 extend generally in a longitudinal direction of the vehicle (i.e., forward and backward along the vehicle body on both lateral sides of the vehicle) along the roof section R. The side sills 2 extend in a longitudinal direction of the vehicle along the vehicle body on both lateral sides of the vehicle on the floor section F. The center pillars 3 are curved pillar members that bow outwardly from the vehicle. The center pillars 3 connect the side roof rails 1 and the side sills 2 together in the vertical direction of the vehicle body. The roof cross member 4 is configured and arranged for connecting the side roof rails 1 at the connecting positions of the center pillars 3 of the vehicle. The floor cross member 5 is configured and arranged for connecting the side sills 2 at the connecting positions of the center pillar 3 of the vehicle, as shown in FIG. 1.

Each center pillar 3 is provided with a collision force converting structure 10 configured and arranged to convert a side collision force acting inwardly on the center pillar 3 in a generally horizontal direction from a vehicle exterior into a force acting lengthwise along the center pillar 3 in a generally vertical direction of the vehicle body. Thus, the vehicle body structure of the present invention is advantageous in that input can be absorbed as compression weight in the longitudinal direction of the pillar members 3 to minimize deformation into the passenger compartment. Moreover, the weight of the pillar members 3 can be reduced and the strength increased because side-impact input is converted/maintained as input that is applied to the pillar members 3 in the vertical direction of the vehicle body by the input conversion structure 10 when side-impact input is applied inward in a substantially horizontal direction to the pillar members 3 from the vehicle exterior.

As shown in FIG. 2(A), the collision force converting structure 10 is obtained by forming an intermediate portion of the center pillar 3 (located between the upper and lower ends of the center pillar 3) such that it curves transversely outward relative to the upper and lower ends of the pillar member and has a protruding apex section T, thus giving the center pillar 3 a generally arc-shaped form. In this embodiment, the apex section T is positioned where a side collision load is imparted to the vehicle body.

Each center pillar 3 is also provided with a shape maintaining structure 20 configured and arranged to hold the shape of the center pillar 3 in a generally linear state when the center pillar 3 deforms transversely inward due to a side collision force.

In this embodiment, the shape maintaining structure of each pillar 3 includes upper and lower deformable sections 21 and 22, and an intermediate deformable section 23 with the upper and lower deformable sections 21 and 22 having upper and lower pairs of load transfer surfaces 24 that substantially separates the upper and lower end sections of the center pillar 3 from an intermediate section. The upper and lower deformable sections 21 and 22 are provided at the upper and lower ends of the center pillar 3, respectively. The upper and lower deformable sections 21 and 22 are generally V-shaped (fan-shaped in a frontal view) with their vertices P1 and P2 positioned on the transversely inward facing surface of the outer wall of the center pillar 3. The intermediate deformable section 23 is provided at an intermediate portion between the upper and lower deformable sections 21 and 22 of the center pillar 3. The upper and lower pairs of load transfer surfaces 24 provided in the closed cross section of the center pillar 3 in such a manner as to separately form the upper and lower surfaces of each of the upper and lower deformable sections 21 and 22, respectively.

Figure 5:
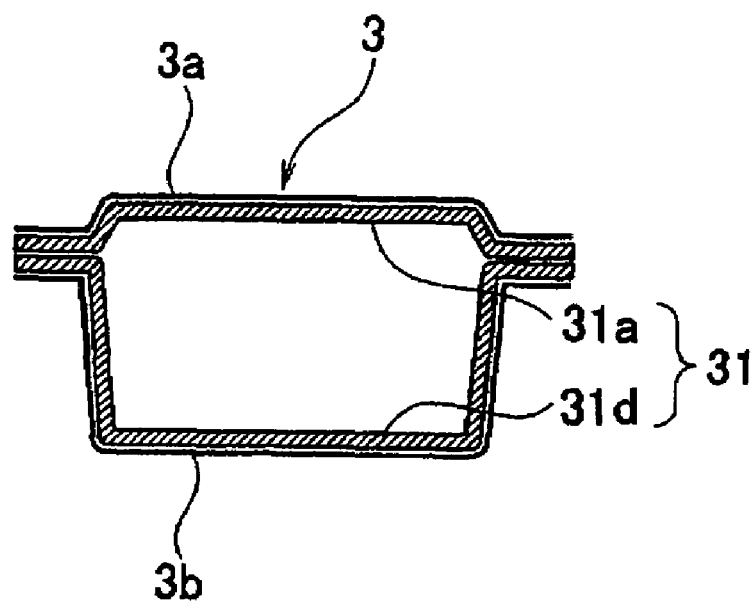
FIG. 5(A) is a cross sectional view of the center pillar of the second embodiment taken along section lines A-A of FIG. 4.
FIG. 5(B) is a cross sectional view of the center pillar of the second embodiment taken along section lines B-B of FIG. 4.
FIG. 5(C) is a cross sectional view of the center pillar of the second embodiment taken along section lines C-C of FIG. 4.
Figure 5:
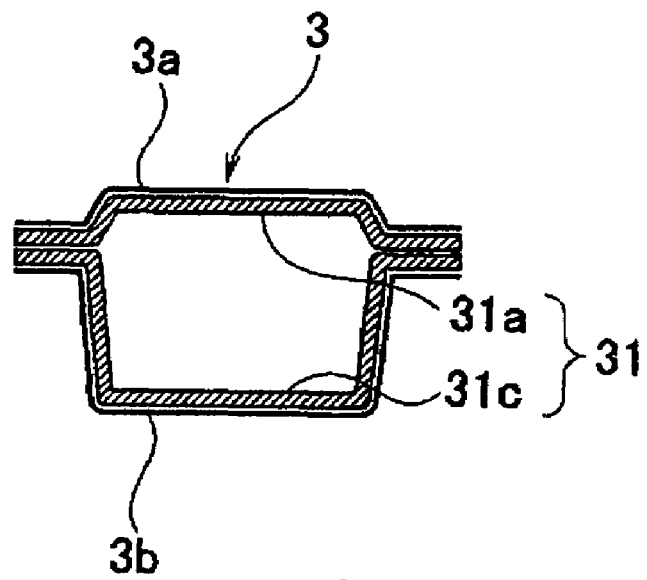
Figure 5:
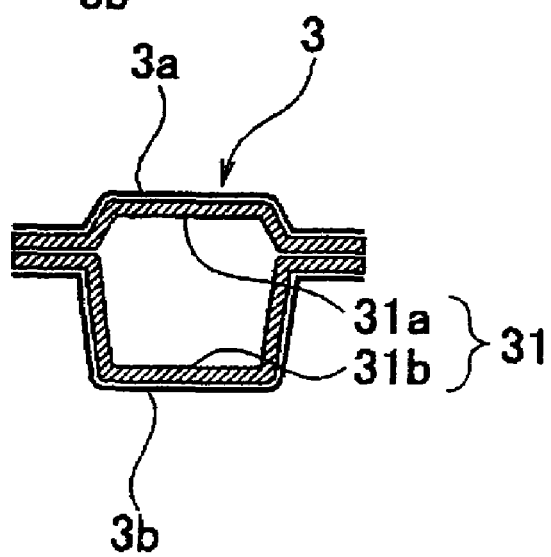

The load transfer surfaces 24 include, for example, partition walls made of a panel material that has been bent so as to have generally V-shaped (fan-shaped in a frontal view of the vehicle). The partition walls can be attached to the pillar inner 3a (see FIGS. 5(A) to 5(C)) of the center pillar 3.

The deformation strength of each deformable section 21, 22 and 23 is smaller than the axial collapse strength of the other portions of the center pillar 3. This is accomplished by configuring the center pillar 3 such that the strength of the pillar walls with respect to lengthwise compressive forces in the center pillar 3 is smaller at the deformable sections 21, 22 and 23 than at other locations along the center pillar 3. More specifically, the deformation strength can be reduced by making the pillar walls that are to undergo compressive deformation, i.e., the walls of the deformable sections 21, 22 and 23, thinner than the walls at other locations along the center pillar 3 or by providing deformation promoting beads on the pillar walls that are to undergo compressive deformation. Another way of controlling the strength of the pillar walls is to form the upper, lower, and intermediate deformable sections 21, 22 and 23 by filling the inside of the pillar member with a foamed material designed for reinforcing metal or synthetic resin in regions other than the regions where the deformable sections 21, 22 and 23 are to be located.

In this first embodiment, the center pillar 3 is curved outward between the upper and lower end parts thereof so as to be generally arc-shaped and the portion of the center pillar 3 that protrudes the farthest outward is called the apex section T. The upper and lower ends of the center pillar 3 connect to the side roof rail 1 and the side sill 2, respectively. The roof cross member 4 and the floor cross member 5, both extending in the transverse direction of the vehicle body, connect to the side roof rail 1 and the side sill 2, respectively, at positions corresponding to the positions where the center pillar 3 connects to the side roof rail 1 and the side sill 2. As shown in FIG. 2(A), in the initial stage of a collision, the load imparted from a colliding body M is born by the apex section T, and the sections of the center pillar 3 above and below the apex section T thrust toward the upper and lower ends of the center pillar 3. As a result, the reaction force of the vehicle body is generated earlier in the initial stage of the collision and the deformation of the vehicle body is suppressed.

Additionally, since the center pillar 3 is curved in such a manner as to have an apex section T, i.e., a section that protrudes farther than any other section, an internal moment that tends to cause the center pillar 3 to bulge transversely outward is induced when a lengthwise compressive force acts on the center pillar 3. Since this internal moment acts in the opposite direction as the external moment imposed by the collision load imparted during a side collision, which tends to cause the center pillar 3 to bulge transversely inward, the internal moment serves to counteract the action of the external moment. As a result, the resultant load born by the center pillar 3 can be reduced and the reaction force of the vehicle body against the colliding body can be increased in a more practical manner.

The thrusting of the upper and lower ends of the center pillar 3 enables the reaction force of the vehicle body structure to be maintained. In other words, the side collision force is converted by the collision force converting structure 10 (which is constituted by the curved shape of the center pillar 3 itself) into a force acting lengthwise in the center pillar 3 in a generally vertical direction of the vehicle body structure and the force is maintained in the generally vertical orientation. As a result, the collision force is absorbed as a lengthwise compressive load in the center pillar 3.

When a side collision force has been converted to a lengthwise compressive load in the center pillar 3 and the compressive load exceeds the deformation strength of the deformable sections 21, 22 and 23, the upper and lower deformable sections 21 and 22 and the intermediate deformable section 23 deform in a collapsing manner and energy is absorbed by way of the deformation.

When the upper and lower deformable sections 21 and 22 have deformed to the point where the load transfer surfaces 24 of each of the upper and lower deformable sections 21 and 22 are pressed together and can deform no further, rotation and intrusion of the upper and lower ends of the center pillar 3 into the passenger compartment is suppressed and the shape maintaining structure 20 functions to hold the shape of the center pillar 3 in a generally linear state. As a result, the load is efficiently dispersed/transferred to the roof side rail 1, the roof cross member 4, the side sill 2, and the floor cross member 5 and the amount by which the center pillar 3 intrudes into the passenger compartment is greatly reduced.

Thus, with this embodiment, the collision force converting structure 10 converts a side collision force imparted to the center pillar 3 into a lengthwise force in the center pillar 3 oriented in a generally vertical direction of the vehicle body and maintains the force in the orientation and the shape maintaining structure 20 holds the shape of the inwardly deforming center pillar 3 in a generally linear state. As a result, the load is dispersed to other members of the vehicle body frame in an efficient manner and the characteristic indicated by curve a in FIG. 3 is obtained. More specifically, in comparison with a conventional structure in which the center pillar is merely arch-shaped, a higher vehicle body reaction force is maintained until the latter stages of deformation and the energy absorption capacity is increased.

Although center pillars 3 generally tend to be narrower at the top than at the bottom, the moment load that acts on the lower portion of the center pillar 3 where the cross sectional shape is larger can be increased by positioning the intermediate deformable section 23 above the lengthwise center position of the center pillar 3. Likewise, when this is done, the moment load that acts on the upper portion of the center pillar 3 where the cross sectional shape is smaller is decreased. Thus, the load distribution can be adjusted in accordance with the shape characteristics and the collision load can be supported in a more practical manner.

As described previously, in this embodiment, the existence of the collision force converting structure 10 is not accompanied by an increase in dedicated (special) members because the collision force converting structure 10 is realized by forming the center pillar 3 itself to be curved and generally arc-shaped. Consequently, the weight of the center pillar 3 can be reduced while still achieving the goals of developing a vehicle body reaction force early when a side collision force acts on the center pillar 3, converting the collision force into a lengthwise compressive force, and maintaining the converted state of the collision force.

Meanwhile, the shape maintaining structure 10 comprises the fan-shaped deformable sections 21 and 22 provided in the upper and lower ends of the center pillar 3, the intermediate deformable section 23 provided between the upper and lower deformable sections 21 and 22, and the load transfer surfaces 24 provided in the upper and lower deformable sections 21 and 22 and serving to restrict the extent of the deformation. The deformation strength of the deformable parts 21, 22 and 23 is set to be smaller than the axial compressive collapse strength of the other portions of the center pillar 3. When a side collision force has been converted to a lengthwise compressive load in the center pillar 3 and the compressive load exceeds the deformation strength of the deformable sections 21, 22 and 23, the deformable sections 21, 22 and 23 act as a deformation inducing structure by reliably deforming in a collapsing manner and serve to absorb energy. Meanwhile, the load transfer surfaces 24 serve to restrict the extent of the deformation at the upper and lower deformable sections 21 and 22 and prevent the upper and lower ends of the center pillar 3 from rotating and intruding into the passenger compartment. As a result, the load transfer surfaces 24 also serve to hold the shape of the center pillar 3 in a generally linear state and enable excellent transfer of the load to other members of the vehicle body frame. The load transfer surfaces 24 are preferably plates that close the ends of each section of the pillar 3.

Furthermore, the deformable sections 21, 22 and 23 can be made easily because they are obtained by making the strength of the pillar walls with respect to lengthwise compressive forces smaller at the deformable sections 21, 22 and 23 than at other locations along the center pillar 3. Whether they are made by adjusting the thickness of the pillar walls or by forming deformation promoting beads on the pillar walls, the deformation starting points and the energy absorption can be adjusted freely in accordance with the required characteristics.

Another way of making the deformable sections 21, 22 and 23 to fill the inside of the pillar member with a foamed material designed for reinforcing metal or synthetic resin in regions other than the regions where the deformable sections 21, 22 and 23 are to be located. This approach allows the deformable sections to be formed without decreasing the rigidity of the pillar.

SECOND EMBODIMENT

Referring now to FIGS. 4 to 6(B), a vehicle body structure in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 4:
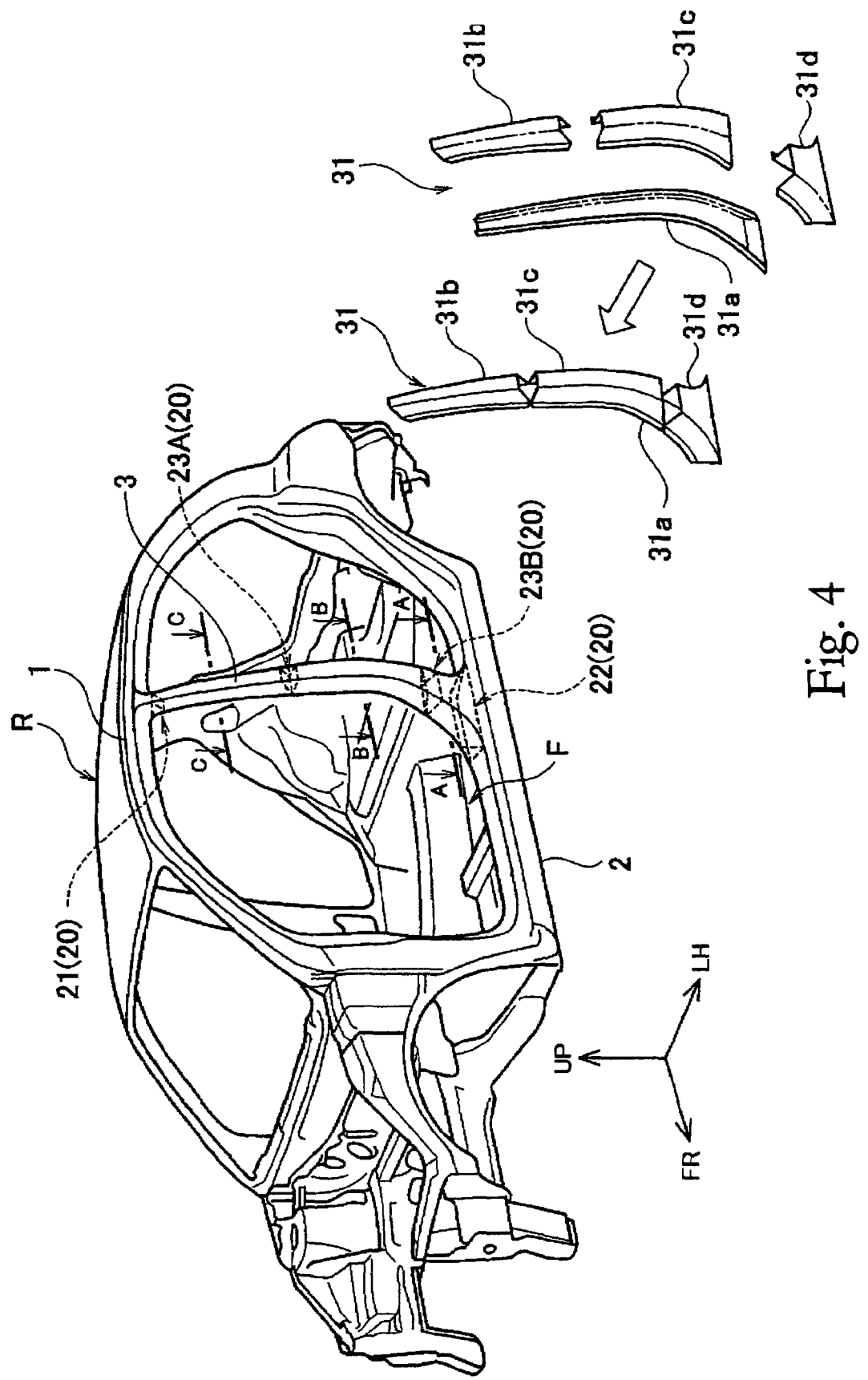
FIG. 4 is a side perspective view of a vehicle body frame structure that includes a vehicle body structure in accordance with a second embodiment of the present invention.

FIG. 4 is a side perspective view of a vehicle body frame structure that includes a vehicle body structure in accordance with a second embodiment of the present invention. FIG. 5(A) is a cross sectional view of the center pillar of the second embodiment taken along section lines A-A of FIG. 4. FIG. 5(B) is a cross sectional view of the center pillar of the second embodiment taken along section lines B-B of FIG. 4. FIG. 5(C) is a cross sectional view of the center pillar of the second embodiment taken along section lines C-C of FIG. 4. FIG. 6(A) is a schematic view illustrating the vehicle body structure of FIG. 4 just prior a side collision to illustrate a deformation mode of the second embodiment of the present invention during a side collision. FIG. 6(B) is a schematic view illustrating the vehicle body structure of FIG. 4 after the side collision of FIG. 6(A) to illustrate the deformation mode of the second embodiment of the present invention during a side collision.

In the vehicle body structure of the second embodiment, the shape maintaining structure 20 includes upper and lower deformable sections 21 and 22, intermediate deformable sections 23A and 23B, and a tensile force transfer promoting structure 30.

The upper and lower deformable sections 21 and 22 are provided at the upper and lower ends of the center pillar 3, and are shaped in a frontal view like fans having vertices P1 and P2 located on the transversely inward facing surface of the outer wall of the center pillar 3. The intermediate deformable sections 23A and 23B are provided at lengthwise intermediate positions above and below the apex section T of the center pillar 3, and are shaped in a frontal view like fans having vertices P3 and P4 located on the transversely outward facing surface of the inner wall of the center pillar 3. The tensile force transfer promoting structure 30 is connected to the center pillar 3 at positions in the vicinity of the vertices P1 and P2 of the upper and lower deformable sections 21 and 22.

Similarly to the first embodiment, the deformation strengths of the deformable sections 21, 22, 23A and 23B are set to be smaller than the axial compressive collapse strength of the other portions of the center pillar 3.

The tensile force transfer promoting structure 30 includes a reinforcing member 31 that is made of a formed panel material. The tensile force transfer promoting structure 30 is configured and arranged to follow the contour of the inside surface of the center pillar 3 and to span substantially from the upper end of the center pillar 3 to the lower end of the center pillar 3, except for the regions where the deformable sections 21, 22, 23A and 23B are located.

The reinforcing member 31 includes a generally flat inner plate 31a and three separate generally C-shaped (cross section) outer plates 31b, 31c and 31d. The generally flat inner plate 31a is arranged along the transversely outward facing surface of the inner wall of the center pillar 3 and spans from the lower surface of the upper deformable section 21 to the upper surface of the lower deformable section. 22. Three generally C-shaped outer plates 31b, 31c, 31d are arranged along the transversely inward facing surface of the outer wall of the center pillar 3 in positions located between the lower surface of the upper deformable section 21 and the upper surface of the upper intermediate deformable section 23A, between the lower surface of the upper intermediate deformable section 23A and the upper surface of the lower intermediate deformable section 23B, and between the lower surface of the lower intermediate deformable section 23B and the upper surface of the lower deformable section 22.

As shown in FIG. 5(A) to (C), the inner plate 31a and the outer plates 31b, 31c and 31d are sandwiched between the flange portions of the pillar inner 3a and the pillar outer 3b of the center pillar 3 and fastened integrally thereto by spot welding.

The inner plate 31a has approximately the same length as the span L between the vertices P1 and P2 of the upper and lower deformable sections 21 and 22. Meanwhile, the total length of the transversely outward facing surfaces of the inner plates 31b, 31c and 31d (the surfaces that follow along the transversely inward facing wall surface of the pillar outer 3b) is also approximately the same length as the span L between the vertices P1 and P2 of the upper and lower deformable sections 21 and 22.

As shown in FIG. 6(A), the collision force converting structure 10 of the second embodiment is obtained similarly to that of the first embodiment, i.e., by forming the center pillar 3 itself such that it curves in a generally arc-shaped form. The collision force converting structure 10 causes the initial reaction force of the vehicle body to develop earlier in the initial stage of a side collision and also functions to maintain the reaction force at a high value. As a result, the sideways force is converted into a compressive load oriented in a generally vertical direction of the vehicle body and energy is absorbed.

In the later stages of the collision, the deformable sections 21, 22, 23A and 23B deform in a collapsing manner and absorb energy and, conversely, the reinforcing member 31 holds the shape of the center pillar 3 in a generally linear state by restricting the degree to which the deformable sections 21, 22, 23A and 23B can deform.

Since the lengths of the inner and outer walls of the reinforcing member 31 (excluding the portions corresponding to the deformable sections 21, 22, 23A and 23B where the reinforcing member 31 does not exist) are both substantially equal to the length of the span L between the vertices P1 and P2 of the upper and lower deformable sections 21 and 22, when the deformable sections 21, 22, 23A and 23B reach their deformation limits as shown in FIG. 6(B), the outwardly curved shape of the center pillar 3 will have been absorbed and the center pillar 3 as a whole will have become a generally linear member. Also, the vertices P1, P3, P4 and P2 of the deformable sections 21, 22, 23A and 23B, respectively, will be arranged in such a manner that a line joining them will have an inwardly bulging shape.

Meanwhile, since the change in the length of the center pillar 3 occurs in two separate regions, one inside the passenger compartment and one outside the passenger compartment, the sum of the lengths of the line segments joining the vertices P1, P3, P4, and P2 of the deformable sections 21, 22, 23A and 23B can be held constant during the deformation process. Thus, a constant length region LT can be formed in the center pillar 3.

As a result, as soon as the deformable sections 21, 22, 23A and 23B reach their deformation limits and the vertices P1, P3, P4 and P2 are arranged in such a manner that a line joining them has an inwardly bulging shape, a tensile force can be generated in the constant length region LT. This tension enables the load to be transferred more efficiently from the center pillar 3 to the side roof rail 1 and the side sill 2 and the deformation and intrusion of the center pillar 3 into the passenger compartment to be suppressed in a practical manner.

Since the tensile force transfer promoting structure 30 of this embodiment is a reinforcing member 31 made of formed panels set to appropriate wall lengths, the structure can be simplified and the rigidity of the pillar can be increased.

Preferably, vehicle body structures of this embodiment also includes a collision force converting structure at each pillar 3, similar to the first embodiment, such that a side collision force acting inwardly on the pillar member 3 in a generally horizontal direction from a vehicle exterior is converted into a force acting lengthwise along the pillar member 3 in a generally vertical direction of the vehicle body structure and to maintain the force in the orientation. In other words, with the present invention, when a side collision force acts inwardly on a pillar member 3 in a generally horizontal direction from a vehicle exterior, the side collision force is converted by the collision force converting structure into a force acting lengthwise along the pillar member 3 in a generally vertical direction of the vehicle body structure and the force is maintained in the generally vertical orientation. As a result, the collision force is absorbed as a lengthwise compressive load in the pillar member 3.

THIRD EMBODIMENT

Figure 7:
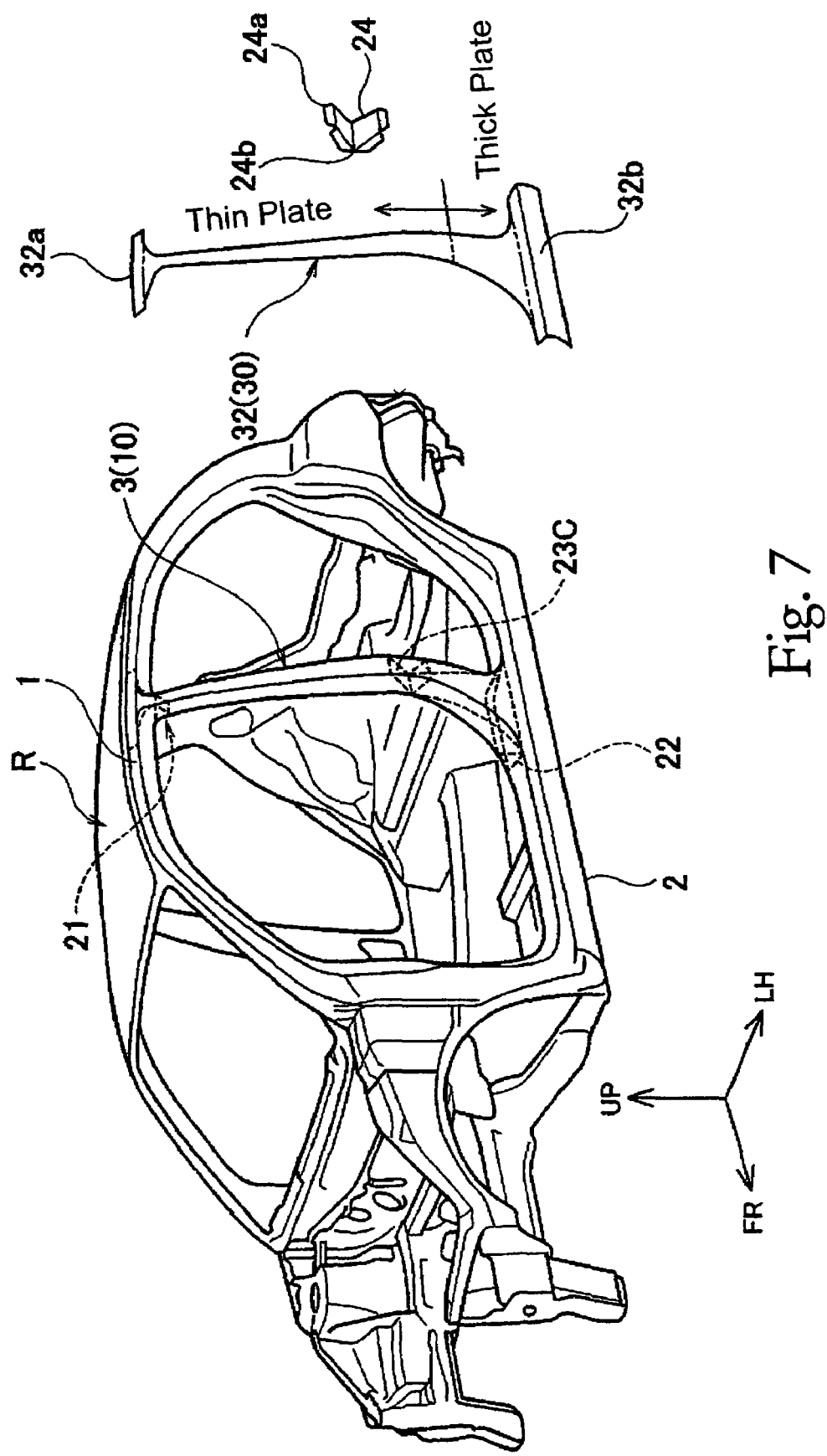
FIG. 7 is a side perspective view of a vehicle body frame structure that includes a vehicle body structure in accordance with a third embodiment of the present invention.

Referring now to FIGS. 7, 8(A) and 8(B), a vehicle body structure in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

FIG. 7 is a side perspective view of a vehicle body frame structure that includes a vehicle body structure in accordance with a third embodiment of the present invention. FIG. 8(A) is a schematic view illustrating the vehicle body structure of FIG. 7 just prior a side collision to illustrate a deformation mode of the second embodiment of the present invention during a side collision. FIG. 8(B) is a schematic view illustrating the vehicle body structure of FIG. 7 after the side collision of FIG. 8(A) to illustrate the deformation mode of the second embodiment of the present invention during a side collision.

In the vehicle body structure of the third embodiment, the shape maintaining structure 20 includes upper and lower deformable sections 21 and 22 and an intermediate deformable sections 23C. The upper and lower deformable sections 21 and 22 are provided at the upper and lower ends of the center pillar 3, and are V-shaped members having fan like shapes in frontal views with vertices P1 and P2 located on the transversely inward facing surface of the outer wall of the center pillar 3. The intermediate deformable sections 23C is provided at the apex section T of the center pillar 3, and is a V-shaped member having a fan like shape in a frontal view with a vertex P3' located on the transversely outward facing surface of the inner wall of the center pillar 3. Load transfer surfaces 24 are provided to separately form the upper and lower surfaces of the deformable sections 21, 22 and 23C. The center pillar 3a also has a tensile force transfer promoting structure 30 connected to the center pillar 3 at positions in the vicinity of the vertices P1 and, P2 of the upper and lower deformable sections 21 and 22.

In this embodiment, the center pillar 3 is made using a tailored blank or other steel sheet material having different thicknesses in different locations. More specifically, the wall strength of the center pillar 3 is adjusted by making the wall thickness of the deformable sections 21, 22 and 23C smaller than the wall thickness at the other portions of the center pillar 3.

Similarly to the first embodiment, each load transfer surface 24 comprises a partition wall made of a panel material that has been bent so as to have a fan-shaped form in a frontal view. As shown in FIG. 7, the load transfer surface 24 has flanges 24a formed on the edges thereof and an apex section 24b. The flanges 24a are spot welded to the wall surface of the corresponding pillar inner 3a or pillar outer 3b and the apex section 24b is abutted against or placed in close proximity to the surface of the opposite wall, i.e., the pillar outer 3b or the pillar inner 3a.

The tensile force transfer promoting structure 30 is made of a generally linear panel material 32 that is arranged inside the center pillar 3 and spans between the vertices P1, P2 of the upper and lower deformable sections 21 and 22.

The panel material 32 is made of a steel sheet material having different thicknesses in different locations (similarly to the center pillar 3 itself) and is configured such that its width in the longitudinal direction of the vehicle body narrows toward the top so as to generally match the width of the center pillar 3 in the same direction and its thickness gradually increases toward the top.

Connecting sections 32a and 32b are provided at the upper and lower ends of the panel material 32 such that the panel material 32 is I-shaped in a side view. The connecting sections 32a and 32b fit into the closed cross sections of the side roof rail 1 and the side sill 2, respectively, and are joined thereto. In addition to being generally linear and arranged so as to span between the vertices P1 and P2 of the upper and lower deformable sections 21 and 22, the panel material 32 abuts against the transversely outward facing surface of the inner wall of the center pillar 3 at an intermediate position along the length of the center pillar 3. Also, the apex section 24b of the load transfer surface 24 provided in the intermediate deformable section 23C abuts against the panel material 32.

As shown in FIG. 8(A), the collision force converting structure 10 of the third embodiment is obtained similarly to that of the first embodiment, i.e., by forming the center pillar 3 itself such that it curves in a generally arc-shaped form. The collision force converting structure 10 causes the initial reaction force of the vehicle body to develop earlier in the initial stage of a side collision and also functions to maintain the reaction force at a high value. As a result, the sideways force is converted into a compressive load oriented in a generally vertical direction of the vehicle body and energy is absorbed.

In the later stages of the collision, the deformable sections 21, 22 and 23C deform in a collapsing manner and absorb energy. Meanwhile, the load transfer surfaces 24 function to restrict the degree of deformation of the deformable sections 21, 22 and 23C and thereby prevent the center pillar 3 from rotating and intruding into the passenger compartment.

Additionally, when the deformable sections 21, 22 and 23C have reached their deformation limits, any force applied to the outer surface of the center pillar 3 acts directly on the panel material 32 (which acts as a tensile force transfer promoting structure 30) through the deformed intermediate deformable section 23C. This transfer of the load prevents the cross sectional structure of the center pillar from collapsing in the vicinity of the intermediate deformable section 23C and, as shown in FIG. 8(B), the resulting tension in the panel material 32 holds the shape of the center pillar 3 in a generally linear state. Thus, the same effects can be obtained as are obtained with the second embodiment.

Although the third embodiment uses a linear panel material 32 for the tensile force transfer promoting structure 30, the same effect can be obtained by installing a wire that spans between the vertices P1 and P2 in a tensioned state instead of a panel material 32.

Moreover, vehicle body structures of this embodiment also preferably includes a collision force converting structure at each pillar 3, similar to the first embodiment, such that a side collision force acting inwardly on the pillar member 3 in a generally horizontal direction from a vehicle exterior is converted into a force acting lengthwise along the pillar member 3 in a generally vertical direction of the vehicle body structure and to maintain the force in the orientation. In other words, with the present invention, when a side collision force acts inwardly on a pillar member 3 in a generally horizontal direction from a vehicle exterior, the side collision force is converted by the collision force converting structure into a force acting lengthwise along the pillar member 3 in a generally vertical direction of the vehicle body structure and the force is maintained in the generally vertical orientation. As a result, the collision force is absorbed as a lengthwise compressive load in the pillar member 3.

FOURTH EMBODIMENT

Figure 9:
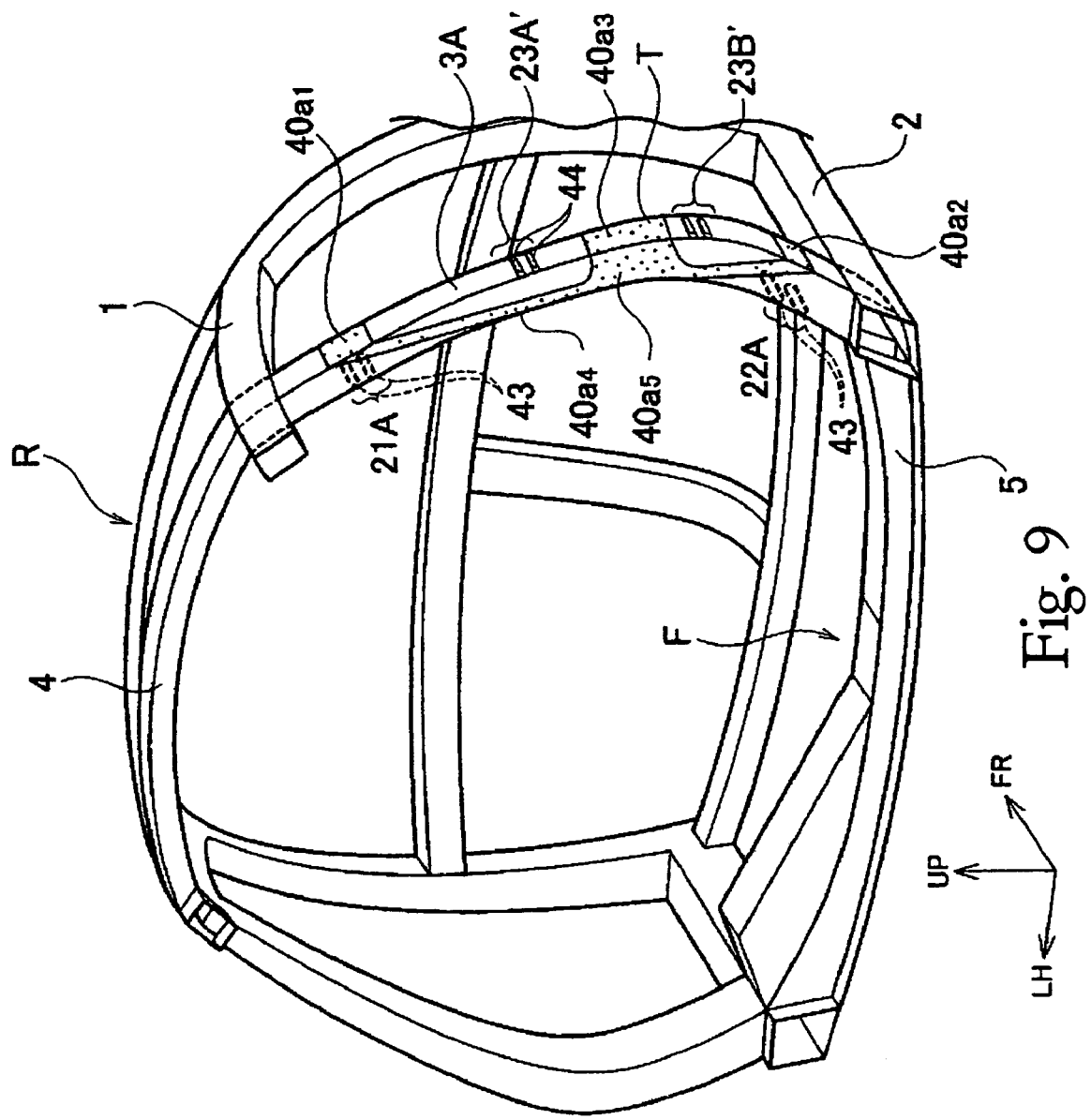
FIG. 9 is a rear perspective view of a passenger compartment portion of a vehicle body frame that includes a vehicle body structure in accordance with a fourth embodiment of the present invention.
Figure 10:
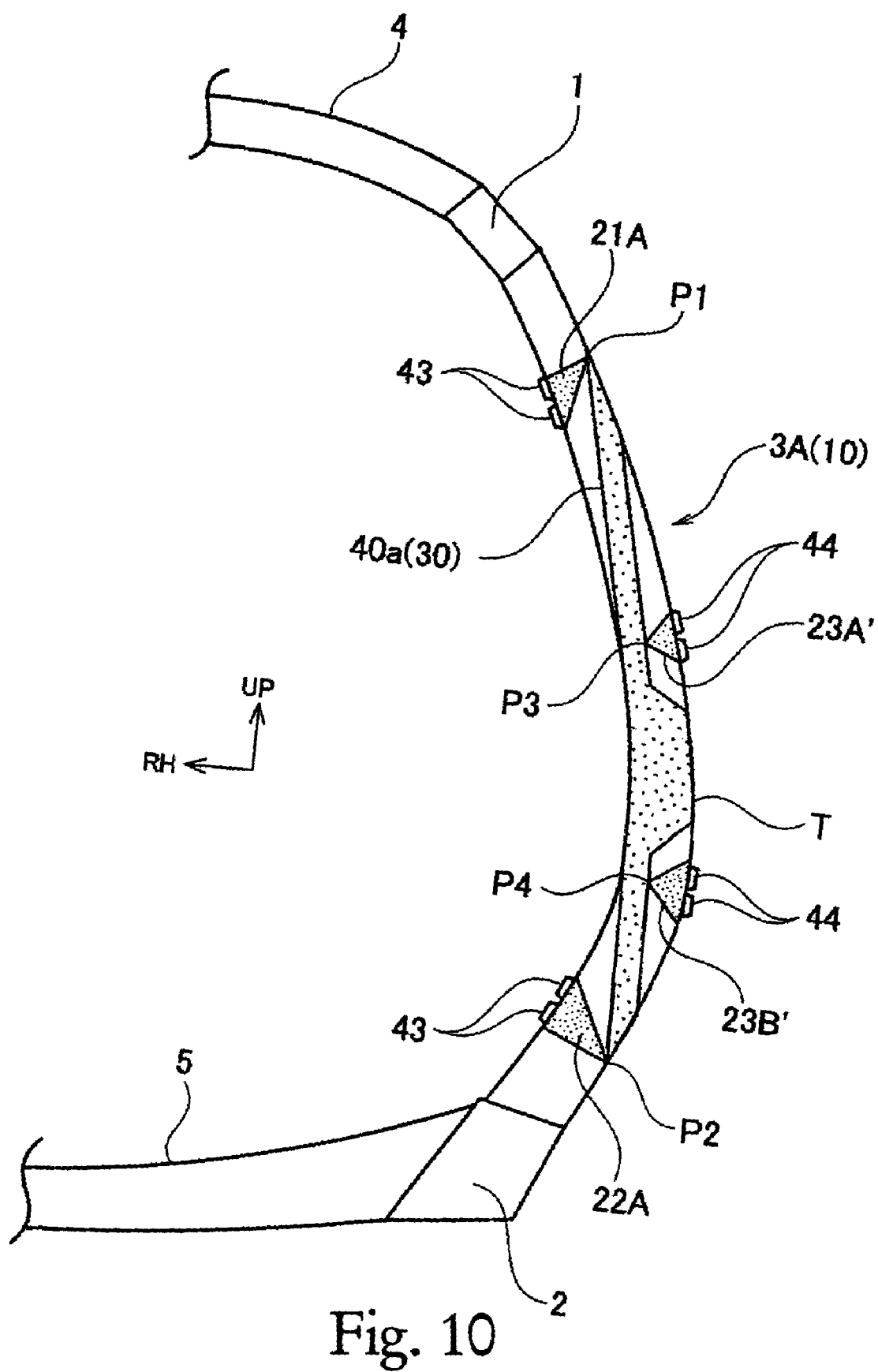
FIG. 10 is a partial rear view of the center pillar on one side of a vehicle body structure illustrated in FIG. 9 in accordance with the fourth embodiment of the present invention.
Figure 11:
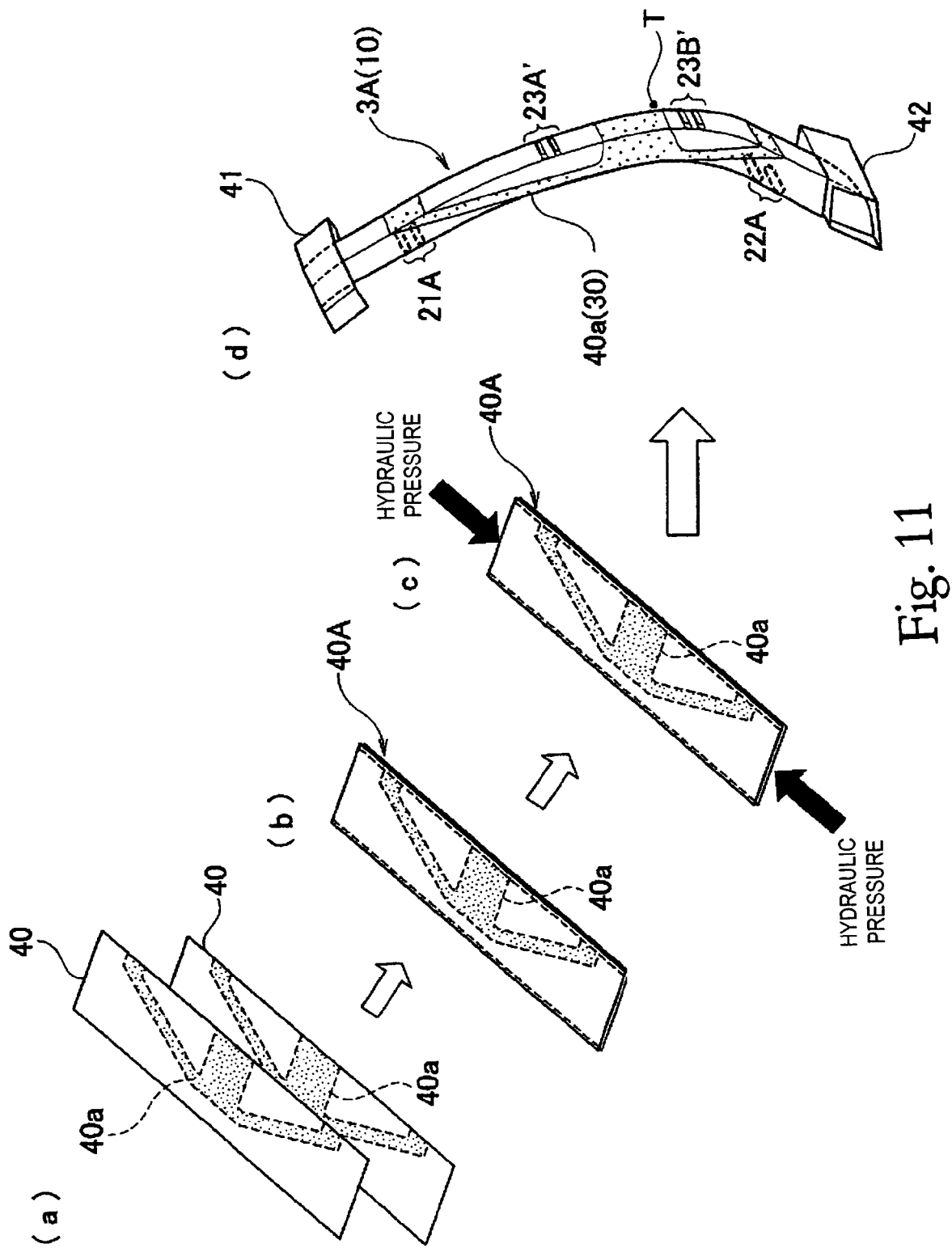
FIG. 11 illustrates a center pillar fabricating sequence (a) to (d) that is used in fabricating a center pillar in accordance with the fourth embodiment of the present invention.

Referring now to FIGS. 9 to 11, a vehicle body structure in accordance with a fourth embodiment will now be explained. In view of the similarity between the fourth embodiment and the prior embodiments, the parts of the fourth embodiment that are identical to the parts of the prior embodiments will be given the same reference numerals as the parts of the prior embodiments. Moreover, the descriptions of the parts of the fourth embodiment that are identical to the parts of the prior embodiments may be omitted for the sake of brevity.

FIG. 9 is a rear perspective view of a passenger compartment portion of a vehicle body frame that includes a vehicle body structure in accordance with a fourth embodiment of the present invention. FIG. 10 is a partial rear view of the center pillar on one side of a vehicle body structure illustrated in FIG. 9 in accordance with the fourth embodiment of the present invention. FIG. 11 illustrates a center pillar fabricating sequence (a) to (d) that is used in fabricating a center pillar in accordance with the fourth embodiment of the present invention.

The vehicle body structure of the fourth embodiment uses a center pillar 3A made by hydraulically forming a steel sheet material having different thicknesses in different locations, as shown in FIG. 11. The tensile force transfer promoting function is obtained from the wall thickness distribution of the center pillar 3A.

The center pillar 3A is formed in the following steps: (a) two elongated rectangular steel plates, i.e., pillar materials 40, having thick-walled sections 40$a$ configured in the same prescribed pattern are arranged in an overlapping fashion; (b) both long sides are laser welded together to obtain a bag-like member 40A; (c) hydraulic pressure is applied to both ends of the bag-like member 40A to form a hollow arc-shaped center pillar 3A having a prescribed closed cross sectional shape. Connecting members 41, 42 are attached to the upper and lower ends of the center pillar 3A. The center pillar 3A is connected to the side roof rail 1 and the side sill 2 by the connecting members 41 and 42 in such a fashion as to penetrate the insides of the closed cross sections of the side roof rail 1 and the side sill 2, and a continuous annular closed cross sectional structure is formed by the roof cross member 4, the center pillars 3A, and the floor cross member 5.

The thick-walled sections 40$a$ are patterned in such a manner as to form the following: thick-walled sections 40$a_1$ and 40$a_2$ provided on the transversely outer wall of the center pillar 3A in locations that are slightly offset toward the middle from the upper and lower ends of the center pillar 3A; an intermediate thick-walled section 40$a_3$ provided on the transversely outer wall of the center pillar 3A in a location slightly above the apex section T; a thick-walled section 40$a_4$ that joins the upper and lower thick-walled sections 40$a_1$, 40$a_2$ in a substantially linear manner at the front and rear walls of the center pillar 3A; and a connecting thick-walled section 40$a_5$ that joins the thick-walled section 40$a_3$ and the substantially linear thick-walled section 40$a_4$ at the front and rear walls.

Meanwhile, pairs of horizontal deformation promoting beads 43 are provided on the transversely inward facing surface of the inner wall of the center pillar 3A at positions offset slightly toward the middle from the upper end part P1 of the upper thick-walled section 40$a_1$ and the lower end part P2 of the lower thick-walled section 40$a_2$. The region that joins the upper horizontal beads 43 to the upper end P1 and the region that joins the lower horizontal beads 43 to the lower end P2 constitute fan-shaped upper and lower deformable sections 21A and 22A that have the ends P1 and P2 as vertices.

Pairs of horizontal deformation promoting beads 44 are provided on the transversely outward facing surface of the outer wall of the center pillar 3A at positions above and below the intermediate thick-walled section 40$a_3$. The regions that join the pairs of horizontal beads 44 to the points P3 and P4, respectively, i.e., the points where the generally linear thick-walled section 40$a_4$ contacts the transversely inner wall of the center pillar 3A, constitute fan-shaped intermediate deformable sections 23A' and 23B' that have the points P3 and P4, respectively, as vertices.

Thus, in the fourth embodiment, the thick-walled sections 40$a_1$ to 40$a_5$, the upper and lower deformable sections 21A and 22A, and the intermediate deformable sections 23A', 23B' constitute the shape maintaining structure 20 and the thick-walled sections 40$a_1$ to 40$a_5$ also function as the tensile force transfer promoting structure 30.

Moreover, vehicle body structures of this embodiment also preferably includes a collision force converting structure at each pillar 3, similar to the first embodiment, such that a side collision force acting inwardly on the pillar member 3 in a generally horizontal direction from a vehicle exterior is converted into a force acting lengthwise along the pillar member 3 in a generally vertical direction of the vehicle body structure and to maintain the force in the orientation. In other words, with the present invention, when a side collision force acts inwardly on a pillar member 3 in a generally horizontal direction from a vehicle exterior, the side collision force is converted by the collision force converting structure into a force acting lengthwise along the pillar member 3 in a generally vertical direction of the vehicle body structure and the force is maintained in the generally vertical orientation. As a result, the collision force is absorbed as a lengthwise compressive load in the pillar member 3.

In addition to providing substantially the same operational effects as the second and third embodiments, the fourth embodiment improves the efficiency with which loads are transferred from a center pillar 3A to the roof cross member 4 and the floor cross member 5 because the upper and lower ends of each center pillar 3A are connected to the respective side roof rail 1 and side sill 2 in such a fashion as to penetrate the inside of the closed cross section of the side roof rail 1 and side sill 2 and because the roof cross member 4, center pillars 3A, floor cross member 5 are arranged so as to form a continuous annular closed cross sectional structure.

FIFTH EMBODIMENT

Figure 12:
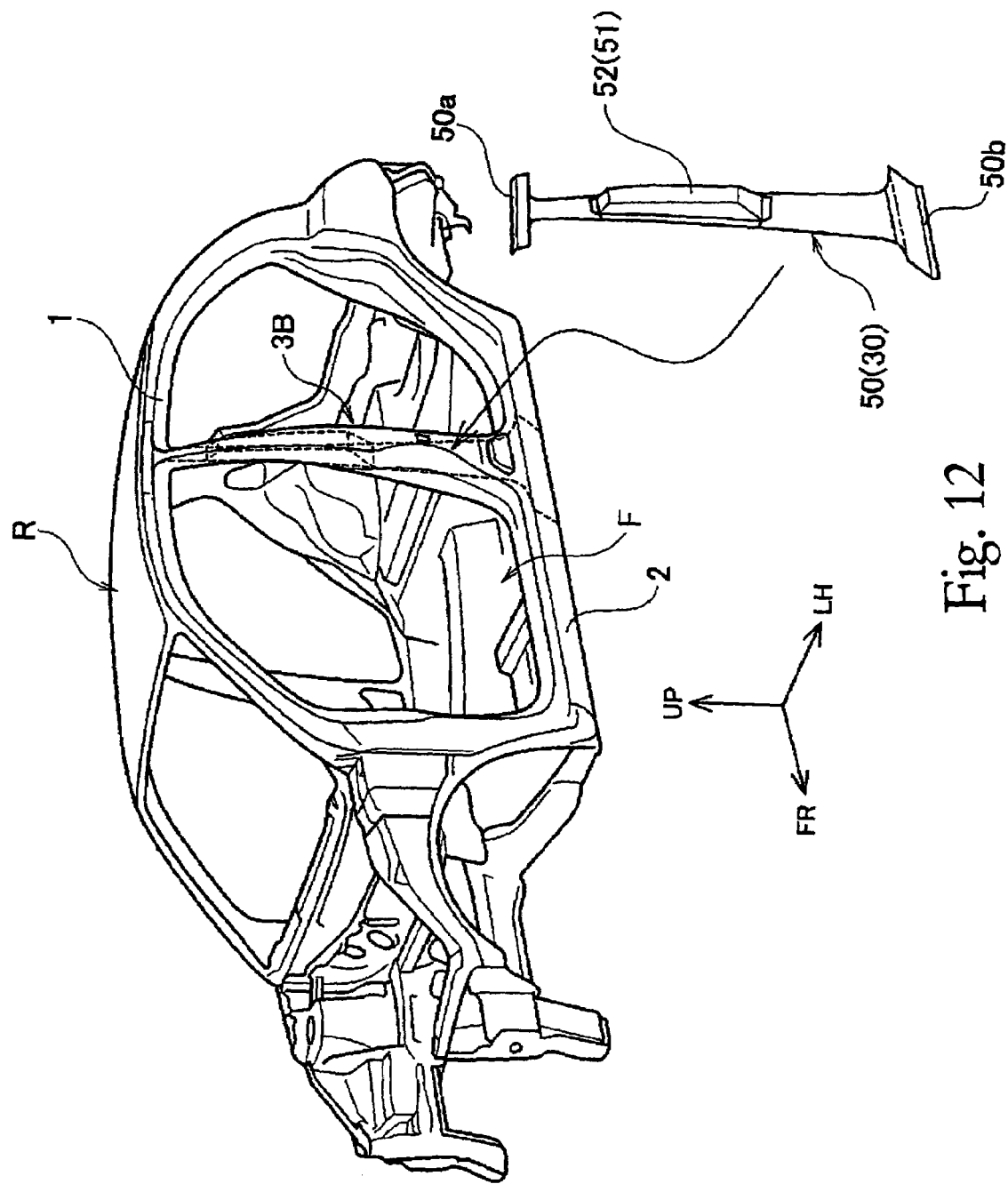
FIG. 12 is a side perspective view of a vehicle body frame structure that includes a vehicle body structure in accordance with a fifth embodiment of the present invention.
Figure 13:
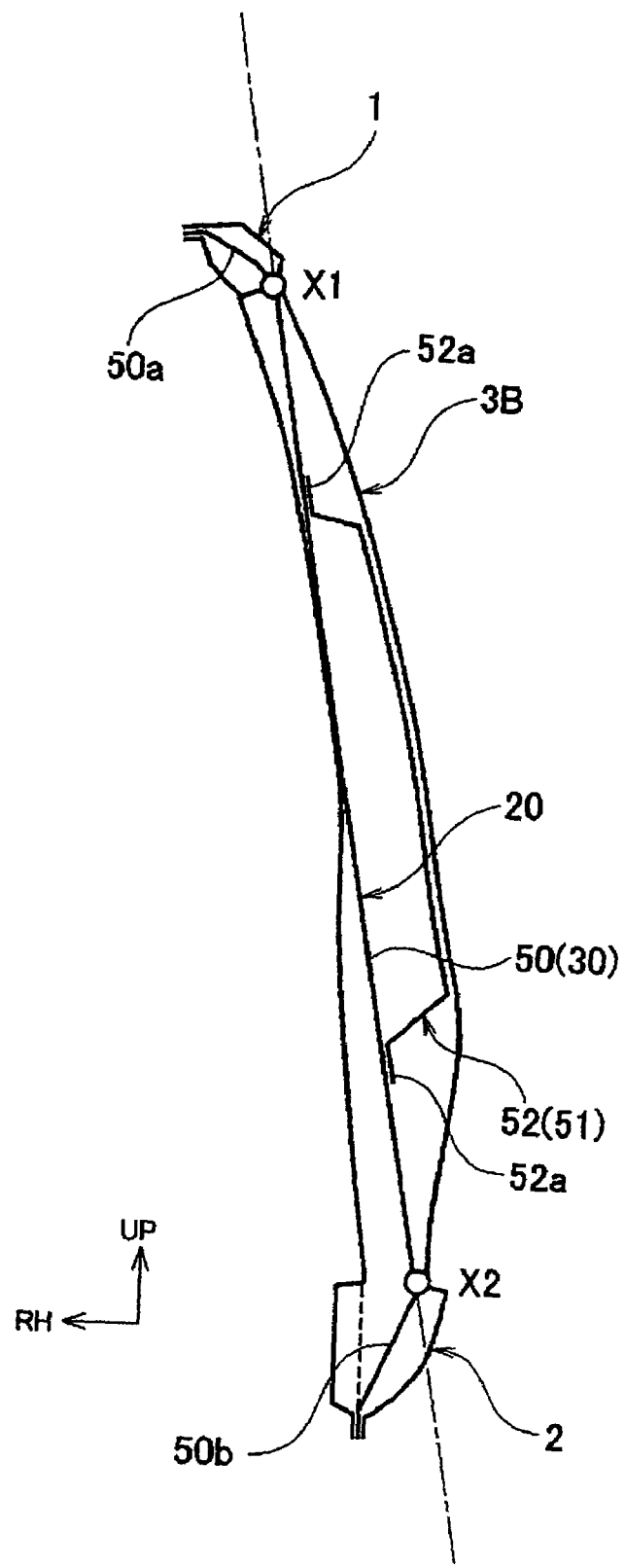
FIG. 13 is a diagrammatic cross sectional view of a center pillar illustrated in FIG. 12 in accordance with the fifth embodiment of the present invention.

Referring now to FIGS. 12 and 13, a vehicle body structure in accordance with a fifth embodiment will now be explained. In view of the similarity between the fifth embodiment and the prior embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

FIG. 12 is a side perspective view of a vehicle body frame structure that includes a vehicle body structure in accordance with a fifth embodiment of the present invention. FIG. 13 is a diagrammatic cross sectional view of a center pillar illustrated in FIG. 12 in accordance with the fifth embodiment of the present invention.

In the vehicle body structure of the fifth embodiment, the center pillar 3B has a gently arched shape and the shape maintaining structure 20 is constituted by configuring the center pillar 3B such that a portion of the transversely outer wall (connecting point X1) near where the upper end of the center pillar 3B connects to the side roof rail 1, a portion of the transversely outer wall (connecting point X2) near where the lower end of the center pillar 3B connects to the side sill 2, and a portion of the transversely inner wall of the center pillar 3B located intermediately between the upper and lower ends of the same are arranged substantially along a straight line.

In this embodiment, a panel material 50 serving as the tensile force transfer promoting structure 30 is provided along a line that joins in a substantially linear manner the connecting point X1, a portion of the transversely inner wall surface of the center pillar 3B, and the connecting point X2.

A tensile force inducing structure 51 is provided inside the closed cross section of a lengthwise intermediate portion of the center pillar 3B and is arranged so as to span between the transversely inward facing surface of the outer wall of the center pillar 3B and the panel material 50.

In this embodiment, the tensile force inducing structure 51 comprises a box-like reinforcing member 52 made of panel material. A flange 52a provided around the perimeter of the opening of the reinforcing member 52 is fixed to the panel material 50 and the reinforcing member 52 is arranged such that it abuts against or is in close proximity to the transversely inward facing surface of the outer wall of the center pillar 3B.

The upper and lower ends of the panel material 50 are formed into connecting sections 50a and 50b that vertically divide the insides of the side roof rail 1 and side sill 2 and are fixed to the side roof rail 1 and side sill 2 at flanges provided on the ends thereof.

In the fifth embodiment, the shape maintaining structure 20 is constituted by configuring the center pillar 3B such that the connecting points X1 and X2 located on the transversely outer wall of the center pillar 3B at the upper and lower ends of the center pillar 3B and a portion of the transversely inner wall of the center pillar 3B located intermediately between the upper and lower ends of the center pillar 3B are arranged substantially along a straight line, thereby forming a constant length region. Thus, although the center pillar 3B deforms in such a manner as to bend toward the inside of the passenger compartment when a collision load is imparted to a lengthwise intermediate section of the center pillar 3B during a side collision, the deformation is restrained from proceeding further into the passenger compartment after the center pillar 3B has deformed to such an extent that its original arched shape has become a generally linear shape. Instead, the side collision load is transferred to the side roof rail 1 and the side sill 2 and the bending deformation of the center pillar 3B toward the passenger compartment is kept small.

More specifically, since a panel material 50 serving as a tensile force transfer promoting structure 30 is provided along a line joining the connecting points X1 and X2 and a reinforcing member 52 serving as a tensile force inducing structure 51 is provided so as to span between the panel material 50 and the transversely inward facing wall surface of the outer wall of the center pillar 3B, a tensile force is produced in the panel material 50 from the moment a collision load is imparted to the outside wall of the center pillar 3B and the load can be immediately dispersed/transferred to the side roof rail 1 and the side sill 2. As a result, the effect of restraining the bending deformation of the center pillar 3B can be achieved in a practical manner.

Moreover, vehicle body structures of this embodiment also preferably includes a collision force converting structure at each pillar 3, similar to the first embodiment, such that a side collision force acting inwardly on the pillar member 3 in a generally horizontal direction from a vehicle exterior is converted into a force acting lengthwise along the pillar member 3 in a generally vertical direction of the vehicle body structure and to maintain the force in the orientation. In other words, with the present invention, when a side collision force acts inwardly on a pillar member 3 in a generally horizontal direction from a vehicle exterior, the side collision force is converted by the collision force converting structure into a force acting lengthwise along the pillar member 3 in a generally vertical direction of the vehicle body structure and the force is maintained in the generally vertical orientation. As a result, the collision force is absorbed as a lengthwise compressive load in the pillar member 3.

SIXTH EMBODIMENT

Figure 14:
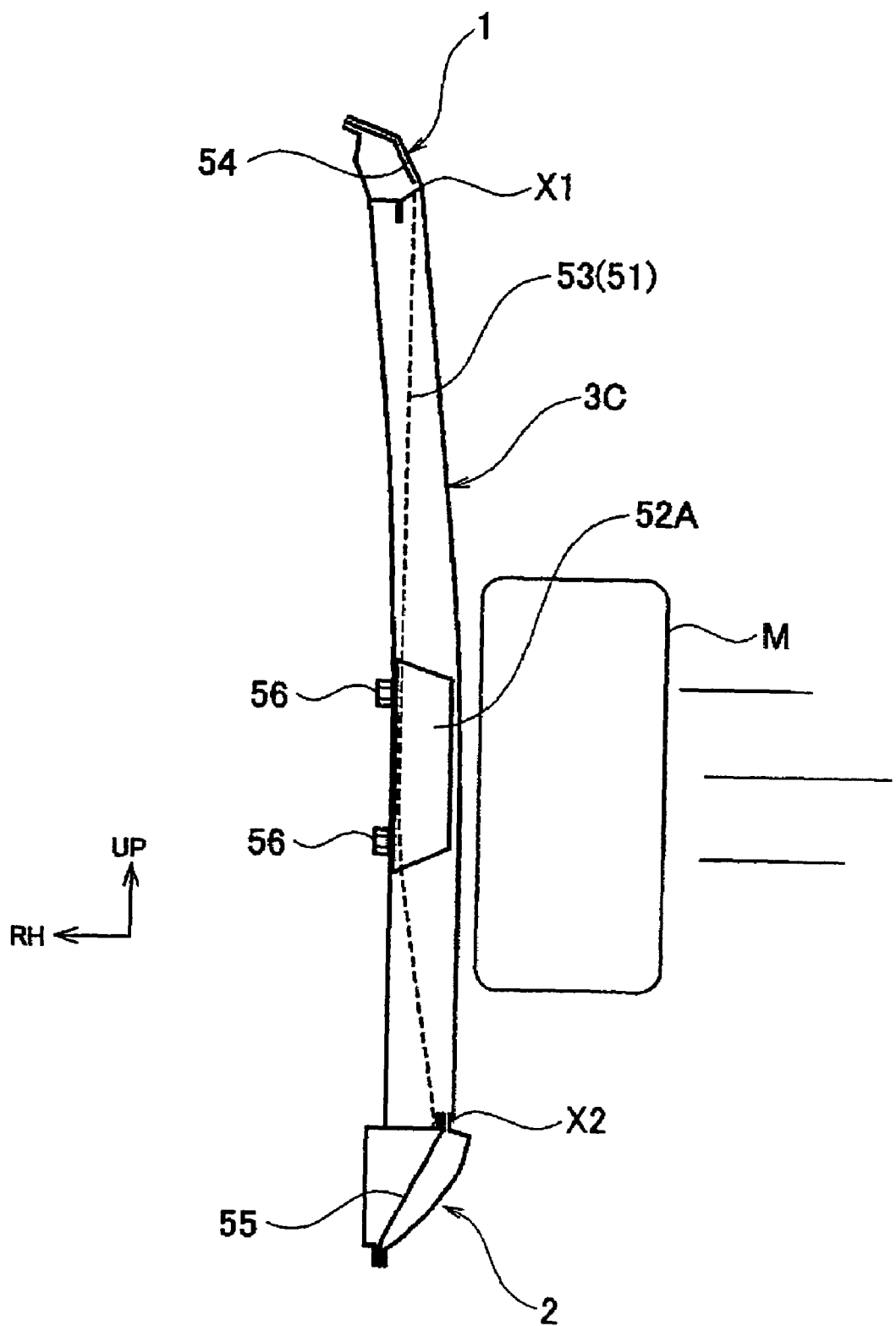
FIG. 14 is a diagrammatic cross sectional view of a center pillar in accordance with a sixth embodiment of the present invention.
Figure 15:
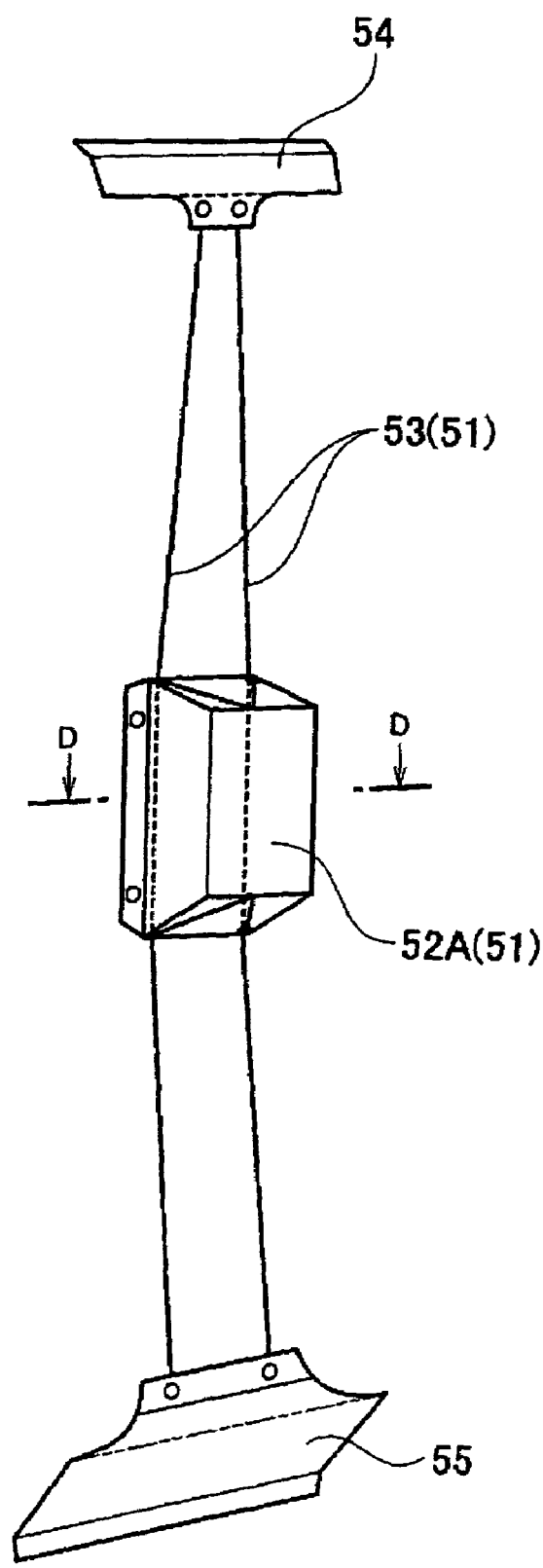
FIG. 15 is a perspective view of a tensile force transfer promoting structure and tensile force inducing structure in accordance with the sixth embodiment of the present invention.
Figure 16:
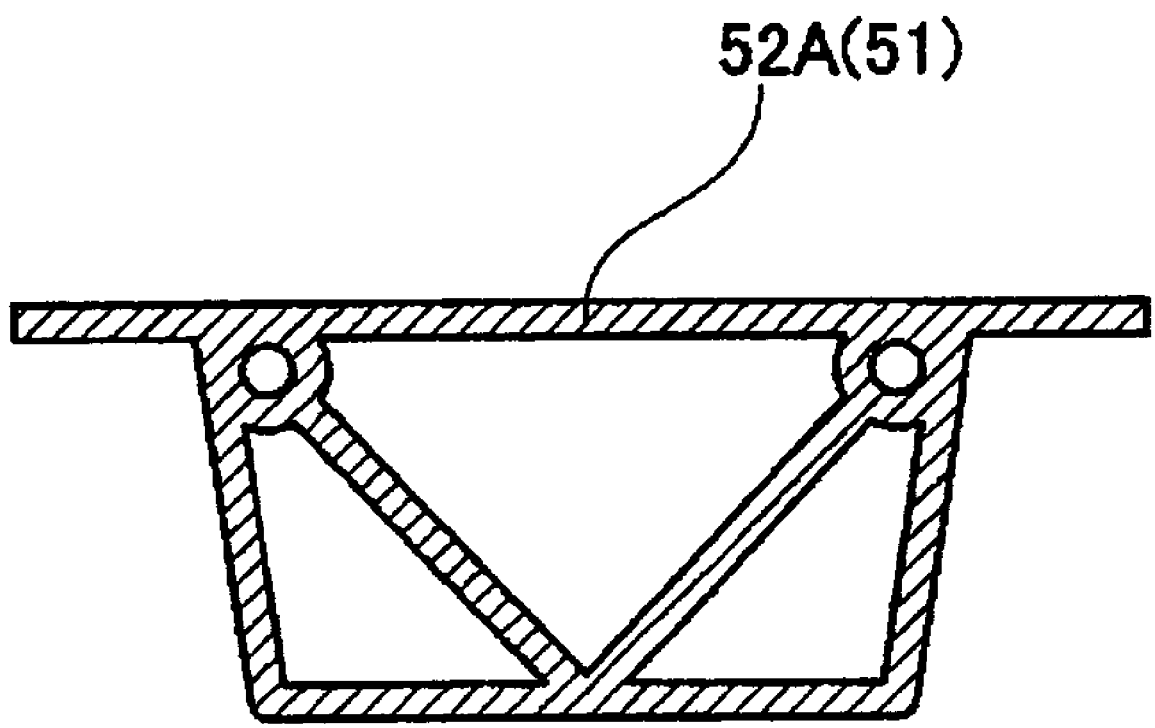
FIG. 16 is a cross sectional view of the tensile force transfer promoting structure and tensile force inducing structure of the sixth embodiment taken along the section line D-D of FIG. 15.

Referring now to FIGS. 14 to 16, a vehicle body structure in accordance with a sixth embodiment will now be explained. In view of the similarity between the sixth embodiment and the prior embodiments, the descriptions of the parts of the sixth embodiment that are identical to or substantially identical to the parts of the prior embodiments may be omitted for the sake of brevity.

FIG. 14 is a diagrammatic cross sectional view of a center pillar in accordance with a sixth embodiment of the present invention. FIG. 15 is a perspective view of the tensile force transfer promoting structure and the tensile force inducing structure. FIG. 16 is a cross sectional view taken along the section line D-D of FIG. 15.

In the sixth embodiment, the center pillar 3C is configured to span between the side roof rail 1 and the side sill 2 in a substantially linear manner. The tensile force transfer promoting structure 30 comprises front and back wires 53 that are arranged in a tensioned state along a line joining a portion of the transversely outer wall (connecting point X1) near where the upper end of the center pillar 3C connects to the side roof rail 1, a portion of the transversely outer wall (connecting point X2) near where the lower end of the center pillar 3C connects to the side sill 2, and a portion of the transversely inner wall of the center pillar 3C located intermediately between the upper and lower ends of the same.

A tensile force inducing structure 51 is provided in a lengthwise intermediate portion of the center pillar 3C and is arranged so as to span between the transversely inward facing surface of the outer wall of the center pillar 3C and a portion of the wires 53 that follows along the transversely outward facing surface of inner wall of the center pillar 3C.

The wires 53 are fastened to upper and lower connecting members 54 and 55 with rivets or the like and the upper and lower connecting members 54 and 55 are connected to the side roof rail 1 and side sill 2 in such a manner that they vertically divide the insides of the closed cross sections of the side roof rail 1 and side sill 2.

As shown in FIGS. 15 and 16, the tensile force inducing structure 51 is a block shaped reinforcing member 52A having a closed cross section that is form by extruding a lightweight metal or the like. The wires 53 are connected to the reinforcing member 52A and the reinforcing member 52A is fastened to the transversely inner wall of the center pillar 3C with bolts 56, thereby forcing an intermediate portion of the wires 53 to follow along the transversely outward facing surface of the inner wall of the center pillar 3C.

Moreover, vehicle body structures of this embodiment also preferably includes a collision force converting structure at each pillar 3, similar to the first embodiment, such that a side collision force acting inwardly on the pillar member 3 in a generally horizontal direction from a vehicle exterior is converted into a force acting lengthwise along the pillar member 3 in a generally vertical direction of the vehicle body structure and to maintain the force in the orientation. In other words, with the present invention, when a side collision force acts inwardly on a pillar member 3 in a generally horizontal direction from a vehicle exterior, the side collision force is converted by the collision force converting structure into a force acting lengthwise along the pillar member 3 in a generally vertical direction of the vehicle body structure and the force is maintained in the generally vertical orientation. As a result, the collision force is absorbed as a lengthwise compressive load in the pillar member 3.

In the fourth embodiment, a continuous annular closed cross sectional structure is formed with the center pillars 3A, the roof cross member 4, and the floor cross member 5 by connecting the center pillars 3A to the roof side rails 1 and the side sills 2 in such a manner that the center pillars 3A penetrate the closed cross sections of the roof side rails 1 and the side sills 2. This approach can also be adopted in the first, second, third, fifth, and sixth embodiments in order to increase the efficiency with which the load is dispersed and transferred.

Thus, the sixth embodiment can provide the same operational effects as the fifth embodiment.

As used herein to describe the various embodiments of the present invention, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle body structure comprising:
a pillar member extending in a generally vertical direction of the vehicle body structure between an upper pillar end section and a lower pillar end section with a convexly arched exterior part located between the upper and lower pillar end sections, the convexly arched exterior part arching outwardly in a transverse vehicle direction;
an upper vehicle body support fixedly coupled to the upper pillar end section of the pillar member at an intermediate portion of the upper vehicle body support, with the upper vehicle body support extending in a longitudinal vehicle direction; and
a lower vehicle body support fixedly coupled to the lower pillar end section of the pillar member at an intermediate portion of the lower vehicle body support with the lower vehicle body support extending in the longitudinal vehicle direction,
the pillar member including a deformable shape maintaining structure configured and arranged to deform transversely inward and axially collapse to absorbed energy, due to a side collision force acting inwardly on the convexly arched exterior part of the pillar member in a generally horizontal direction from a vehicle exterior, and such that the convexly arched exterior part becomes more a generally linear shape to maintain a generally linear shape of the pillar member between the upper and lower pillar end sections.

2. A vehicle body structure comprising:
a pillar member configured and arranged to extend in a generally vertical direction of the vehicle body structure between an upper pillar end section and a lower pillar end section;
an upper vehicle body support fixedly coupled to the upper pillar end section of the pillar member; and
a lower vehicle body support fixedly coupled to the lower pillar end section of the pillar member,
the pillar member including a shape maintaining structure configured and arranged to maintain a generally linear shape of the pillar member between the upper and lower pillar end sections upon being deformed transversely inward due to a side collision force acting inwardly on the pillar member in a generally horizontal direction from a vehicle exterior,
the pillar member further including includes a collision force converting structure configured and arranged to convert the side collision force acting inwardly on the pillar member in the generally horizontal direction from the vehicle exterior into a force acting lengthwise along the pillar member in a generally vertical direction of the vehicle body structure.

3. The vehicle body structure as recited in claim 2, wherein
the collision force converting structure includes a convexly curved section formed by curving an intermediate portion of the pillar member in a transversely outward direction relative to the upper and lower pillar end sections, and with at least one of the upper and lower vehicle body supports being configured and arranged to restrict movement of the upper and lower pillar end sections in generally the vertical direction of the vehicle body structure.

4. A vehicle body structure comprising:
a pillar member configured and arranged to extend in a generally vertical direction of the vehicle body structure between an upper pillar end section and a lower pillar end section;
an upper vehicle body support fixedly coupled to the upper pillar end section of the pillar member; and
a lower vehicle body support fixedly coupled to the lower pillar end section of the pillar member,
the pillar member including a shape maintaining structure configured and arranged to maintain a generally linear shape of the pillar member between the upper and lower pillar end sections upon being deformed transversely inward due to a side collision force acting inwardly on the pillar member in a generally horizontal direction from a vehicle exterior, the shape maintaining structure including
upper and lower deformable sections provided at the upper and lower pillar end sections that include generally V-shaped areas of weakening with vertices positioned on a transversely outside wall of the pillar member, and
an intermediate deformable section provided at an intermediate portion between the upper and lower deformable sections, and
each of the upper, lower and intermediate deformable sections having a deformation strength that is smaller than an axial collapse strength of remaining portions of the pillar member.

5. The vehicle body structure as recited in claim 4, wherein
the shape maintaining structure further includes upper and lower load transfer surfaces formed by closed cross sections of the pillar member to separately form upper and lower surfaces of each of the upper and lower deformable sections, respectively.

6. The vehicle body structure as recited in claim 4, wherein
the intermediate deformable section of the pillar member is positioned above a lengthwise center position of the pillar member.

7. A vehicle body structure comprising:
a pillar member configured and arranged to extend in a generally vertical direction of the vehicle body structure between an upper pillar end section and a lower pillar end section;
an upper vehicle body support fixedly coupled to the upper pillar end section of the pillar member; and
a lower vehicle body support fixedly coupled to the lower pillar end section of the pillar member,
the pillar member including a shape maintaining structure configured and arranged to maintain a generally linear shape of the pillar member between the upper and lower pillar end sections upon being deformed transversely inward due to a side collision force acting inwardly on the pillar member in a generally horizontal direction from a vehicle exterior,
the shape maintaining structure including
upper and lower deformable sections provided at the upper and lower pillar end sections that include generally V-shaped areas of weakening with vertices positioned on a transversely outside wall of the pillar member, and
an intermediate deformable section provided at an intermediate portion between the upper and lower deformable sections that include a central generally V-shaped area with its vertex positioned on a transversely inside wall of the pillar member, and
each of the upper, lower and intermediate deformable sections having an axial deformation strength that is smaller than an axial collapse strength of remaining portions of the pillar member.

8. The vehicle body structure as recited in claim 7, wherein
the shape maintaining structure includes a tensile force transfer promoting structure connected at positions near the vertices of the upper and lower deformable sections.

9. The vehicle body structure as recited in claim 8, wherein
the tensile force transfer promoting structure includes a panel shaped reinforcing member that is configured and arranged to follow an inside contour of the pillar member and to span substantially between the upper and lower pillar end sections except for the regions where the deformable sections are located.

10. The vehicle body structure as recited in claim 8, wherein
the tensile force transfer promoting structure includes a panel member arranged inside the pillar member and configured to span from the vertex of the upper deformable section to the vertex of the lower deformable section in a substantially linear manner.

11. The vehicle body structure as recited in claim 8, wherein
the tensile force transfer promoting structure includes a wire arranged inside the pillar member and configured to span from the vertex of the upper deformable section to the vertex of the lower deformable section in a substantially linear manner.

12. The vehicle body structure as recited in claim 8, wherein
each of the upper, lower and intermediate deformable sections are separated by a pair of load transfer surfaces, respectively.

13. The vehicle body structure as recited in claim 4, wherein
the upper vehicle body support includes a roof cross member connecting first and second side roof rails together,
the lower vehicle body support includes a floor cross member connecting first and second side sills together,
the pillar member is a first pillar connected between the first side roof rail and the first side sill,
the second side roof rail and the second side sill are connected by a second pillar having the shape maintaining structure, and
the first and second pillars penetrate closed cross sections of the first and second side roof rails and the first and second side sills, respectively, such that a continuous annular closed cross sectional structure is formed by the roof cross member, the first and second pillars, and the floor cross member.

14. The vehicle body structure as recited in claim 4, wherein
each of the upper, lower and intermediate deformable sections have an axial deformation strength with respect to lengthwise compressive forces of the pillar member that is smaller than an axial collapse strength of remaining portions of the pillar member.

15. The vehicle body structure as recited in claim 14, wherein
the upper, lower and intermediate deformable sections have thinner wall thicknesses than the remaining portions of the pillar member.

16. The vehicle body structure as recited in claim 14, wherein
the pillar member includes at least one deformation promoting bead in a location where compressive deformation occurs due to the side collision force acting inwardly on the pillar member in the generally horizontal direction from the vehicle exterior.

17. The vehicle body structure as recited in claim 4, wherein
the upper, lower, and intermediate deformable sections are formed by filling an inside area of the pillar member with a reinforcing foamed material in regions other than where the upper, lower and intermediate deformable sections are located.

18. The vehicle body structure as recited in claim 2, wherein
the pillar member spans substantially linearly between the upper and lower vehicle body supports, such that the pillar member has a first outer wall surface near the upper vehicle body support, a second outer wall surface near the lower vehicle body support, and an intermediate inner wall surface disposed at an intermediate position along the length of the pillar member, which are arranged substantially along a single straight line.

19. The vehicle body structure as recited in claim 18, wherein
the shape maintaining structure of the pillar member further includes a tensile force transfer promoting structure provided on the single straight line that joins the first outer wall surface, the second outer wall surface, the intermediate inner wall surface.

20. The vehicle body structure as recited in claim 19, wherein
the shape maintaining structure of the pillar member further includes a tensile force inducing structure disposed inside a closed cross section of the pillar member to span between an intermediate outer wall surface of the pillar member and the tensile force transfer promoting structure.

21. The vehicle body structure as recited in claim 2, wherein
the shape maintaining structure of the pillar member includes a tensile force transfer promoting structure arranged inside the pillar member on a line that joins in a substantially linear manner a first outer wall surface of the pillar member near the upper vehicle body support, a second outer wall surface of the pillar member near the lower vehicle body support, and an intermediate inner wall surface of the pillar member disposed at an intermediate position along the length of the pillar member, which are arranged substantially along a single straight line.

22. The vehicle body structure as recited in claim 21, wherein
the shape maintaining structure of the pillar member includes a tensile force inducing structure arranged to span between an intermediate outer wall surface of the pillar member and a portion of the tensile force transfer promoting structure that follows along the intermediate inner wall surface of the pillar member.

23. The vehicle body structure as recited in claim 22, wherein
the tensile force inducing structure includes a block-like reinforcing member that is fixed to the tensile force transfer promoting structure, and that abuts against or is in close proximity to the intermediate outer wall surface of the pillar member.

24. A vehicle body structure comprising:

vertical structural means for vertically supporting a side portion of the vehicle body structure and for forming a convexly arched exterior part located between upper and lower pillar end sections and arching outwardly in a transverse vehicle direction;

upper structural means for restricting upward movement of the vertical structural means at an intermediate portion of the upper structural means, with the upper structural means extending in a longitudinal vehicle direction;

lower structural means for restricting downward movement of the vertical structural means at an intermediate portion of the lower structural means, with the lower structural means extending in a longitudinal vehicle direction; and deformable shape maintaining means for deformably maintaining a generally linear shape of the vertical structural means between the upper and lower structural means by inward deformation and axially collapsing to absorb energy, upon the deformable shape maintaining means being deformed transversely inward due to a side collision force acting inwardly on the convexly arched exterior part of the vertical structural means in a generally horizontal direction from a vehicle exterior, such that the convexly arched exterior part becomes more a generally linear shape.

* * * * *